US012087312B2

(12) United States Patent
Wang et al.

(10) Patent No.: US 12,087,312 B2
(45) Date of Patent: Sep. 10, 2024

(54) STEREO ENCODING METHOD AND STEREO ENCODER

(71) Applicant: Huawei Technologies Co., Ltd., Shenzhen (CN)

(72) Inventors: Bin Wang, Shenzhen (CN); Haiting Li, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/461,641

(22) Filed: Sep. 6, 2023

(65) Prior Publication Data

US 2023/0419974 A1 Dec. 28, 2023

Related U.S. Application Data

(63) Continuation of application No. 17/983,724, filed on Nov. 9, 2022, now Pat. No. 11,790,924, which is a (Continued)

(30) Foreign Application Priority Data

Dec. 30, 2016 (CN) ........................ 201611261548.7

(51) Int. Cl.
*G10L 19/008* (2013.01)
*G10L 19/032* (2013.01)

(52) U.S. Cl.
CPC .......... *G10L 19/008* (2013.01); *G10L 19/032* (2013.01)

(58) Field of Classification Search
CPC ..... G10L 19/00; G10L 19/008; G10L 19/032; G10L 19/16; G10L 19/167; G10L 19/22; (Continued)

(56) References Cited

U.S. PATENT DOCUMENTS 7,756,713 B2 * 7/2010 Chong .................. G10L 19/008 704/500
8,200,351 B2 6/2012 Kurniawati et al.
(Continued)

FOREIGN PATENT DOCUMENTS

CN 1765153 A 4/2006
CN 101040323 A 9/2007
(Continued)

OTHER PUBLICATIONS

Shi, D., et al., "High Efficiency Stereo Audio Compression Method Using Polar Coordinate Principle Component Analysis for Wireless Communications," XP011495737, China Institute of Communications, vol. 10, No. 2, Feb. 2013, pp. 98-111.
(Continued)

*Primary Examiner* — Thang V Tran
(74) *Attorney, Agent, or Firm* — Conley Rose, P.C.

(57) ABSTRACT

In a stereo encoding method, a channel combination encoding solution of a current frame is first obtained, and then a quantized channel combination ratio factor of the current frame and an encoding index of the quantized channel combination ratio factor are obtained based on the obtained channel combination encoding solution, so that an obtained primary channel signal and secondary channel signal of the current frame meet a characteristic of the current frame.

20 Claims, 11 Drawing Sheets

Related U.S. Application Data continuation of application No. 17/317,136, filed on May 11, 2021, now Pat. No. 11,527,253, which is a continuation of application No. 16/906,792, filed on Jun. 19, 2020, now Pat. No. 11,043,225, which is a continuation of application No. 16/458,697, filed on Jul. 1, 2019, now Pat. No. 10,714,102, which is a continuation of application No. PCT/CN2017/117588, filed on Dec. 20, 2017.

(58) Field of Classification Search

CPC . G10L 25/06; G10L 25/18; H04S 1/00; H04S 1/002; H04S 2400/00; H04S 2400/01; H04S 2400/03; H04S 2420/01; H04S 2420/03; H04R 3/00; H04R 3/04; H04R 5/00

See application file for complete search history.

(56) References Cited

U.S. PATENT DOCUMENTS

| | | | |
|---|---|---|---|
| 8,504,378 B2 * | 8/2013 | Liu ........................ G10L 19/008 704/503 |
| 8,959,026 B2 | 2/2015 | Kim et al. |
| 8,976,971 B2 | 3/2015 | Zhang et al. |
| 9,105,265 B2 | 8/2015 | Wu et al. |
| 9,269,361 B2 * | 2/2016 | Ragot .................... G10L 19/008 |
| 10,224,042 B2 | 3/2019 | Chebiyyam et al. |
| 10,325,606 B2 | 6/2019 | Vaillancourt et al. |
| 10,553,223 B2 | 2/2020 | Fatus et al. |
| 10,714,102 B2 | 7/2020 | Wang et al. |
| 11,043,225 B2 | 6/2021 | Wang et al. |
| 11,527,253 B2 | 12/2022 | Wang et al. |
| 2002/0154041 A1 | 10/2002 | Suzuki et al. |
| 2006/0171542 A1 | 8/2006 | Den Brinker et al. |
| 2008/0154583 A1 | 6/2008 | Goto et al. |
| 2009/0030704 A1 | 1/2009 | Takagi et al. |
| 2009/0210236 A1 | 8/2009 | Moon et al. |
| 2011/0119055 A1 | 5/2011 | Lee et al. |
| 2011/0182433 A1 | 7/2011 | Takada |
| 2012/0300945 A1 | 11/2012 | Wu et al. |
| 2012/0308018 A1 | 12/2012 | Miao et al. |
| 2013/0003980 A1 | 1/2013 | Toguri et al. |
| 2015/0310871 A1 | 10/2015 | Vasilache et al. |
| 2016/0336014 A1 | 11/2016 | Brockmole et al. |
| 2017/0161309 A1 | 6/2017 | William |
| 2017/0236521 A1 | 8/2017 | Chebiyyam et al. |
| 2017/0365260 A1 | 12/2017 | Chebiyyam et al. |
| 2018/0261231 A1 * | 9/2018 | Vaillancourt ......... G10L 19/002 |

FOREIGN PATENT DOCUMENTS

| | | | |
|---|---|---|---|
| CN | 102150204 | A | 8/2011 |
| CN | 102227769 | A | 10/2011 |
| CN | 102855876 | A | 1/2013 |
| JP | 2002244698 | A | 8/2002 |
| KR | 20160015280 | A | 2/2016 |
| KR | 102251639 | A | 5/2021 |
| WO | 2017161309 | A1 | 9/2017 |

OTHER PUBLICATIONS

Wu, W., et al., "Parametric stereo coding scheme with a new downmix method and whole band inter channel time/phase differences," XP032509104, ICASSP 2013—IEEE International Conference on Acoustics, Speech and Signal Processing, May 2013, pp. 556-560.

Jansson, T., "Stereo coding for the ITU-T G.719 codec," XP055114839, UPTEC F11 034, May 17, 2011, 164 pages.

Fatus, B., "Master Thesis : Parametric Coding for Spatial Audio," KTH, Stockholm, Sweden. Dec. 2015, 70 pages.

Jansson, T., "Stereo coding for the ITU-T G.719 codec," UPTEC F11 034, 2011, 164 pages.

* cited by examiner

STEREO ENCODING METHOD AND STEREO ENCODER

CROSS-REFERENCE TO RELATED APPLICATIONS

This application is a continuation application of U.S. patent application Ser. No. 17/983,724, filed on Nov. 9, 2022, which is a continuation application of U.S. patent application Ser. No. 17/317,136, filed on May 11, 2021, now U.S. Pat. No. 11,527,253, which is a continuation application of U.S. patent application Ser. No. 16/906,792, filed on Jun. 19, 2020, now U.S. Pat. No. 11,043,225, which is a continuation application of U.S. patent application Ser. No. 16/458,697, filed on Jul. 1, 2019, now U.S. Pat. No. 10,714,102, which is a continuation application of International Patent Application No. PCT/CN2017/117588, filed on Dec. 20, 2017, which claims priority to Chinese Patent Application No. 201611261548.7, filed on Dec. 30, 2016. All of the aforementioned patent applications are hereby incorporated by reference in their entireties.

TECHNICAL FIELD

This application relates to audio encoding and decoding technologies, and specifically, to a stereo encoding method and a stereo encoder.

BACKGROUND

As quality of life is improved, a requirement for high-quality audio is constantly increased. Compared with mono audio, stereo audio has a sense of orientation and a sense of distribution for each acoustic source, and can improve clarity, intelligibility, and a sense of presence of information. Therefore, stereo audio is highly favored by people.

A time domain stereo encoding and decoding technology is a common stereo encoding and decoding technology. In the existing time domain stereo encoding technology, an input signal is usually downmixed into two mono signals in time domain, for example, a Mid/Sid (M/S) encoding method. First, a left channel and a right channel are downmixed into a mid-channel and a side-channel. The mid-channel is 0.5*(L+R), and represents information about a correlation between the two channels, and the side-channel is 0.5*(L−R), and represents information about a difference between the two channels, where L represents a left channel signal, and R represents a right channel signal. Then, a mid-channel signal and a side-channel signal are separately encoded using a mono encoding method. The mid-channel signal is usually encoded using a relatively large quantity of bits, and the side channel signal is usually encoded using a relatively small quantity of bits.

When a stereo audio signal is encoded using the existing stereo encoding method, a signal type of the stereo audio signal is not considered, and consequently, a sound image of a synthesized stereo audio signal obtained after encoding is unstable, a drift phenomenon occurs, and encoding quality needs to be improved.

SUMMARY

Embodiments of the present disclosure provide a stereo encoding method and a stereo encoder, so that different encoding modes can be selected based on a signal type of a stereo audio signal, thereby improving encoding quality.

According to a first aspect of the present disclosure, a stereo encoding method is provided and includes performing time domain preprocessing on a left channel time domain signal and a right channel time domain signal that are of a current frame of a stereo audio signal, to obtain a preprocessed left channel time domain signal and a preprocessed right channel time domain signal that are of the current frame, where the time domain preprocessing may include filtering processing, and may be high-pass filtering processing, performing delay alignment processing on the preprocessed left channel time domain signal and the preprocessed right channel time domain signal that are of the current frame, to obtain the left channel time domain signal obtained after delay alignment and the right channel time domain signal obtained after delay alignment that are of the current frame, determining a channel combination solution of the current frame based on the left channel time domain signal obtained after delay alignment and the right channel time domain signal obtained after delay alignment that are of the current frame, where the channel combination solution may include a near in-phase signal channel combination solution or a near out-of-phase signal channel combination solution, obtaining a quantized channel combination ratio factor of the current frame and an encoding index of the quantized channel combination ratio factor based on the determined channel combination solution of the current frame, and the left channel time domain signal obtained after delay alignment and the right channel time domain signal obtained after delay alignment that are of the current frame, where methods for obtaining a quantized channel combination ratio factor and an encoding index of the quantized channel combination ratio factor that are corresponding to the near in-phase signal channel combination solution and the near out-of-phase signal channel combination solution are different, determining an encoding mode of the current frame based on the determined channel combination solution of the current frame, downmixing, based on the encoding mode of the current frame and the quantized channel combination ratio factor of the current frame, the left channel time domain signal obtained after delay alignment and the right channel time domain signal obtained after delay alignment that are of the current frame, to obtain a primary channel signal and a secondary channel signal of the current frame, and encoding the primary channel signal and the secondary channel signal of the current frame.

With reference to the first aspect, in an implementation of the first aspect, the determining a channel combination solution of the current frame based on the left channel time domain signal obtained after delay alignment and the right channel time domain signal obtained after delay alignment that are of the current frame includes determining a signal type of the current frame based on the left channel time domain signal obtained after delay alignment and the right channel time domain signal obtained after delay alignment that are of the current frame, where the signal type includes a near in-phase signal or a near out-of-phase signal, and correspondingly determining the channel combination solution of the current frame at least based on the signal type of the current frame, where the channel combination solution includes a near out-of-phase signal channel combination solution used for processing a near out-of-phase signal or a near in-phase signal channel combination solution used for processing a near in-phase signal.

With reference to the first aspect or the foregoing implementation of the first aspect, in an implementation of the first aspect, if the channel combination solution of the current frame is the near out-of-phase signal channel combination solution used for processing a near out-of-phase signal, the obtaining a quantized channel combination ratio factor of the current frame and an encoding index of the quantized channel combination ratio factor based on the determined channel combination solution of the current frame, and the left channel time domain signal obtained after delay alignment and the right channel time domain signal obtained after delay alignment that are of the current frame includes obtaining an amplitude correlation difference parameter between the left channel time domain signal that is obtained after long-term smoothing and that is of the current frame and the right channel time domain signal that is obtained after long-term smoothing and that is of the current frame based on the left channel time domain signal obtained after delay alignment and the right channel time domain signal obtained after delay alignment that are of the current frame, converting the amplitude correlation difference parameter into a channel combination ratio factor of the current frame, and quantizing the channel combination ratio factor of the current frame, to obtain the quantized channel combination ratio factor of the current frame and the encoding index of the quantized channel combination ratio factor.

With reference to any one of the first aspect or the implementations of the first aspect, in an implementation of the first aspect, the converting the amplitude correlation difference parameter into a channel combination ratio factor of the current frame includes performing mapping processing on the amplitude correlation difference parameter to obtain a mapped amplitude correlation difference parameter, where a value of the mapped amplitude correlation difference parameter is within a preset amplitude correlation difference parameter value range, and converting the mapped amplitude correlation difference parameter into the channel combination ratio factor of the current frame.

With reference to any one of the first aspect or the implementations of the first aspect, in an implementation of the first aspect, the performing mapping processing on the amplitude correlation difference parameter includes performing amplitude limiting on the amplitude correlation difference parameter, to obtain an amplitude correlation difference parameter obtained after amplitude limiting, where the amplitude limiting may be segmented amplitude limiting or non-segmented amplitude limiting, and the amplitude limiting may be linear amplitude limiting or non-linear amplitude limiting, and mapping the amplitude correlation difference parameter obtained after amplitude limiting, to obtain the mapped amplitude correlation difference parameter, where the mapping may be segmented mapping or non-segmented mapping, and the mapping may be linear mapping or non-linear mapping.

With reference to any one of the first aspect or the implementations of the first aspect, in an implementation of the first aspect, the performing amplitude limiting on the amplitude correlation difference parameter, to obtain an amplitude correlation difference parameter obtained after amplitude limiting includes performing amplitude limiting on the amplitude correlation difference parameter using the following formula:

$$\text{diff\_lt\_corr\_limit} = \begin{cases} \text{RATIO\_MAX}, & \text{when diff\_lt\_corr} > \text{RATIO\_MAX} \\ \text{diff\_lt\_corr}, & \text{in other cases} \\ \text{RATIO\_MIN}, & \text{when diff\_lt\_corr} < \text{RATIO\_MIN} \end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting, RATIO_MIN is a minimum value of the amplitude correlation difference parameter obtained after amplitude limiting, RATIO_MAX>RATIO_MIN, a value range of RATIO_MAX is [1.0, 3.0], and a value of RATIO_MAX may be 1.0, 1.5, 3.0, or the like, and a value range of RATIO_MIN is [−3.0, −1.0], and a value of RATIO_MIN may be −1.0, −1.5, −3.0, or the like.

With reference to any one of the first aspect or the implementations of the first aspect, in an implementation of the first aspect, the performing amplitude limiting on the amplitude correlation difference parameter, to obtain an amplitude correlation difference parameter obtained after amplitude limiting includes performing amplitude limiting on the amplitude correlation difference parameter using the following formula:

$$\text{diff\_lt\_corr\_limit} = \begin{cases} \text{RATIO\_MAX}, & \text{when diff\_lt\_corr} > \text{RATIO\_MAX} \\ \text{diff\_lt\_corr}, & \text{in other cases} \\ \text{RATIO\_MAX}, & \text{when diff\_lt\_corr} < -\text{RATIO\_MAX} \end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting, a value range of RATIO_MAX is [1.0, 3.0], and a value of RATIO_MAX may be 1.0, 1.5, 3.0, or the like.

With reference to any one of the first aspect or the implementations of the first aspect, in an implementation of the first aspect, the mapping the amplitude correlation difference parameter obtained after amplitude limiting, to obtain the mapped amplitude correlation difference parameter includes mapping the amplitude correlation difference parameter using the following formula:

$$\text{diff\_lt\_corr\_map} = \begin{cases} A_1 * \text{diff\_lt\_corr\_limit} + B_1, & \text{when diff\_lt\_corr\_limit} > \text{RATIO\_HIGH} \\ A_2 * \text{diff\_lt\_corr\_limit} + B_2, & \text{when diff\_lt\_corr\_limit} < \text{RATIO\_LOW} \\ A_3 * \text{diff\_lt\_corr\_limit} + B_3, & \text{when RATIO\_LOW} \le \text{diff\_lt\_corr\_limit} \le \text{RATIO\_HIGH} \end{cases},$$

where $$A_1 = \frac{\text{MAP\_MM} - \text{MAP\_HIGH}}{\text{RATIO\_MM} - \text{RATIO\_HIGH}},$$

$$B_1 = \text{MAP\_MAX} - \text{RATIO\_MAX} * A_1 \text{ or } B_1 = \text{MAP\_HIGH} - \text{RATIO\_HIGH}^* A_1,$$

$$A_2 = \frac{\text{MAP\_LOW} - \text{MAP\_MIN}}{\text{RATIO\_LOW} - \text{RATIO\_MIN}},$$

-continued $$B_2 = \text{MAP\_LOW} - \text{RATIO\_LOW}^* A_2 \text{ or } B_2 = \text{MAP\_MIN} - \text{RATIO\_MIN}^* A_2,$$

$$A_3 = \frac{\text{MAP\_HIGH} - \text{MAP\_LOW}}{\text{RATIO\_HIGH} - \text{RATIO\_LOW}},$$

$$B_3 = \text{MAP\_HIGH} - \text{RATIO\_HIGH} * A_3 \text{ or } B_3 = \text{MAP\_LOW} - \text{RATIO\_LOW}^* A_3,$$

where diff_lt_corr_limit is the amplitude correlation difference parameter obtained after amplitude limiting, diff_lt_corr_map is the mapped amplitude correlation difference parameter, MAP_MAX is a maximum value of the mapped amplitude correlation difference parameter, MAP_HIGH is a high threshold of a value of the mapped amplitude correlation difference parameter, MAP_LOW is a low threshold of a value of the mapped amplitude correlation difference parameter, MAP_MIN is a minimum value of the mapped amplitude correlation difference parameter, MAP_MIN, a value range of MAP_MAX is [2.0, 2.5] and a specific value may be 2.0, 2.2, 2.5, or the like, a value range of MAP_HIGH is [1.2, 1.7] and a specific value may be 1.2, 1.5, 1.7, or the like, a value range of MAP_LOW is [0.8, 1.3] and a specific value may be 0.8, 1.0, 1.3, or the like, and a value range of MAP_MIN is [0.0, 0.5] and a specific value may be 0.0, 0.3, 0.5, or the like, and RATIO_MAX is a maximum value of the amplitude correlation difference parameter obtained after amplitude limiting, RATIO_HIGH is a high threshold of the amplitude correlation difference parameter obtained after amplitude limiting, RATIO_LOW is a low threshold of the amplitude correlation difference parameter obtained after amplitude limiting, RATIO_MIN is a minimum value of the amplitude correlation difference parameter obtained after amplitude limiting, RATIO_MAX>RATIO_HIGH>RATIO_LOW>RATIO_MIN, where for values of RATIO_MAX and RATIO_MIN, refer to the foregoing description, a value range of RATIO_HIGH is [0.5, 1.0] and a specific value may be 0.5, 1.0, 0.75, or the like, and a value range of RATIO_LOW is [−1.0, −0.5] and a specific value may be −0.5, −1.0, −0.75, or the like.

With reference to any one of the first aspect or the implementations of the first aspect, in an implementation of the first aspect, the mapping the amplitude correlation difference parameter obtained after amplitude limiting, to obtain the mapped amplitude correlation difference parameter includes mapping the amplitude correlation difference parameter using the following formula:

$$\text{diff\_lt\_corr\_map} = \begin{cases} 1.08 * \text{diff\_lt\_corr\_limit} + 0.38, & \text{when diff\_lt\_corr\_limit} > 0.5 * \text{RATIO\_MAX} \\ 0.64 * \text{diff\_lt\_corr\_limit} + 1.28, & \text{when diff\_lt\_corr\_limit} < -0.5 * \text{RATIO\_MAX} \\ 0.26 * \text{diff\_lt\_corr\_limit} + 0.995, & \text{in other cases} \end{cases},$$

where diff_lt_corr_map is the mapped amplitude correlation difference parameter, diff_lt_corr_limit is the amplitude correlation difference parameter obtained after amplitude limiting, RATIO_MAX is a maximum value of the amplitude correlation difference parameter obtained after amplitude limiting, and a value range of RATIO_MAX is [1.0, 3.0].

With reference to any one of the first aspect or the implementations of the first aspect, in an implementation of the first aspect, the mapping the amplitude correlation difference parameter obtained after amplitude limiting, to obtain the mapped amplitude correlation difference parameter includes mapping the amplitude correlation difference parameter using the following formula:

$$\text{diff\_lt\_corr\_map} = a * b^{\text{diff\_lt\_corr\_limit}} + c,$$

where diff_lt_corr_map is the mapped amplitude correlation difference parameter, diff_lt_corr_limit is the amplitude correlation difference parameter obtained after amplitude limiting, a value range of a is [0, 1], for example, a value of a may be 0, 0.3, 0.5, 0.7, 1, or the like, a value range of b is [1.5, 3], for example, a value of b may be 1.5, 2, 2.5, 3, or the like, and a value range of c is [0, 0.5], for example, a value of c may be 0, 0.1, 0.3, 0.4, 0.5, or the like.

With reference to any one of the first aspect or the implementations of the first aspect, in an implementation of the first aspect, the mapping the amplitude correlation difference parameter obtained after amplitude limiting, to obtain the mapped amplitude correlation difference parameter includes mapping the amplitude correlation difference parameter using the following formula:

$$\text{diff\_lt\_corr\_map} = a * (\text{diff\_lt\_corr\_limit} + 1.5)^2 + b * (\text{diff\_lt\_corr\_limit} + 1.5) + c,$$

where diff_lt_corr_map is the mapped amplitude correlation difference parameter, diff_lt_corr_limit is the amplitude correlation difference parameter obtained after amplitude limiting, a value range of a is [0.08, 0.12], for example, a value of a may be 0.08, 0.1, 0.12, or the like, a value range of b is [0.03, 0.07], for example, a value of b may be 0.03, 0.05, 0.07, or the like, and a value range of c is [0.1, 0.3], for example, a value of c may be 0.1, 0.2, 0.3, or the like.

With reference to any one of the first aspect or the implementations of the first aspect, in an implementation of the first aspect, the converting the mapped amplitude correlation difference parameter into the channel combination ratio factor of the current frame includes converting the mapped amplitude correlation difference parameter into the channel combination ratio factor of the current frame using the following formula:

$$\text{ratio\_SM} = \frac{1 - \cos\left(\frac{\pi}{2} * \text{diff\_lt\_corr\_map}\right)}{2},$$

where ratio_SM is the channel combination ratio factor of the current frame, and diff_lt_corr_map is the mapped amplitude correlation difference parameter.

With reference to any one of the first aspect or the implementations of the first aspect, in an implementation of the first aspect, the obtaining an amplitude correlation difference parameter between the left channel time domain signal obtained after long-term smoothing and the right channel time domain signal obtained after long-term smoothing that are of the current frame based on the left channel time domain signal obtained after delay alignment and the right channel time domain signal obtained after delay alignment that are of the current frame includes determining a reference channel signal of the current frame based on the left channel time domain signal obtained after delay alignment and the right channel time domain signal obtained after delay alignment that are of the current frame, calculating a left channel amplitude correlation parameter between the left channel time domain signal that is obtained after delay alignment and that is of the current frame and the reference channel signal, and a right channel amplitude correlation parameter between the right channel time domain signal that is obtained after delay alignment and that is of the current frame and the reference channel signal, and calculating the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter.

With reference to any one of the first aspect or the implementations of the first aspect, in an implementation of the first aspect, the calculating the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter includes determining an amplitude correlation parameter between the left channel time domain signal that is obtained after long-term smoothing and that is of the current frame and the reference channel signal based on the left channel amplitude correlation parameter, determining an amplitude correlation parameter between the right channel time domain signal that is obtained after long-term smoothing and that is of the current frame and the reference channel signal based on the right channel amplitude correlation parameter, and determining the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal.

With reference to any one of the first aspect or the implementations of the first aspect, in an implementation of the first aspect, the determining the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal includes determining the amplitude correlation difference parameter between the left channel time domain signal obtained after long-term smoothing and the right channel time domain signal obtained after long-term smoothing that are of the current frame using the following formula: $diff\_lt\_corr=tdm\_lt\_corr\_LM\_SM_{cur}-tdm\_lt\_corr\_RM\_SM_{cur}$, where diff_lt_corr is the amplitude correlation difference parameter between the left channel time domain signal obtained after long-term smoothing and the right channel time domain signal obtained after long-term smoothing that are of the current frame, $tdm\_lt\_corr\_LM\_SM_{cur}$ is the amplitude correlation parameter between the left channel time domain signal that is obtained after long-term smoothing and that is of the current frame and the reference channel signal, and $tdm\_lt\_corr\_RM\_SM_{cur}$ is the amplitude correlation parameter between the right channel time domain signal that is obtained after long-term smoothing and that is of the current frame and the reference channel signal.

With reference to any one of the first aspect or the implementations of the first aspect, in an implementation of the first aspect, the determining an amplitude correlation parameter between the left channel time domain signal that is obtained after long-term smoothing and that is of the current frame and the reference channel signal based on the left channel amplitude correlation parameter includes determining the amplitude correlation parameter $tdm\_lt\_corr\_LM\_SM_{cur}$ between the left channel time domain signal that is obtained after long-term smoothing and that is of the current frame and the reference channel signal using the following formula: $tdm\_lt\_corr\_LM\_SM_{cur}=\alpha*tdm\_lt\_corr\_LM\_SM_{cur}+(1-\alpha)corr\_LM$, where $tdm\_lt\_corr\_LM\_SM_{pre}$ is an amplitude correlation parameter between a left channel time domain signal that is obtained after long-term smoothing and that is of a previous frame of the current frame and the reference channel signal, a is a smoothing factor, a value range of a is [0, 1], and corr_LM is the left channel amplitude correlation parameter, and the determining an amplitude correlation parameter between the right channel time domain signal that is obtained after long-term smoothing and that is of the current frame and the reference channel signal based on the right channel amplitude correlation parameter includes determining the amplitude correlation parameter $tdm\_lt\_corr\_RM\_SM_{cur}$ between the right channel time domain signal that is obtained after long-term smoothing and that is of the current frame and the reference channel signal using the following formula:

$$tdm\_lt\_corr\_RM\_SM_{cur}=\beta*tdm\_lt\_corr\_RM\_SM_{pre}+(1-\beta)corr\_LM,$$

where $tdm\_lt\_corr\_RM\_SM_{pre}$ is an amplitude correlation parameter between a right channel time domain signal that is obtained after long-term smoothing and that is of the previous frame of the current frame and the reference channel signal, β is a smoothing factor, a value range of β is [0, 1], and corr_RM is the right channel amplitude correlation parameter.

With reference to any one of the first aspect or the implementations of the first aspect, in an implementation of the first aspect, the calculating a left channel amplitude correlation parameter between the left channel time domain signal that is obtained after delay alignment and that is of the current frame and the reference channel signal, and a right channel amplitude correlation parameter between the right channel time domain signal that is obtained after delay alignment and that is of the current frame and the reference channel signal includes determining the left channel amplitude correlation parameter corr_LM between the left channel time domain signal that is obtained after delay alignment and that is of the current frame and the reference channel signal using the following formula:

$$corr\_LM=\frac{\sum_{n=0}^{N-1}|x'_L(n)|*|mono\_i(n)|}{\sum_{n=0}^{N-1}|mono\_i(n)|*|mono\_i(n)|},$$

where $x'_L(n)$ is the left channel time domain signal that is obtained after delay alignment and that is of the current frame, N is a frame length of the current frame, and mono_i(n) is the reference channel signal, and determining the right channel amplitude correlation parameter corr_RM between the right channel time domain signal that is obtained after delay alignment and that is of the current frame and the reference channel signal using the following formula:

$$\text{corr\_RM} = \frac{\sum_{n=0}^{N-1} |x'_R(n)| * |\text{mono\_i}(n)|}{\sum_{n=0}^{N-1} |\text{mono\_i}(n)| * |\text{mono\_i}(n)|},$$

where $x'_R(n)$ is the right channel time domain signal that is obtained after delay alignment and that is of the current frame.

According to a second aspect of the present disclosure, a stereo encoder is provided and includes a processor and a memory, where the memory stores an executable instruction, and the executable instruction is used to instruct the processor to perform the method according to any one of the first aspect or the implementations of the first aspect.

According to a third aspect of the present disclosure, a stereo encoder is provided and includes a preprocessing unit, configured to perform time domain preprocessing on a left channel time domain signal and a right channel time domain signal that are of a current frame of a stereo audio signal, to obtain a preprocessed left channel time domain signal and a preprocessed right channel time domain signal that are of the current frame, where the time domain preprocessing may include filtering processing, and may be high-pass filtering processing, a delay alignment processing unit, configured to perform delay alignment processing on the preprocessed left channel time domain signal and the preprocessed right channel time domain signal that are of the current frame, to obtain the left channel time domain signal obtained after delay alignment and the right channel time domain signal obtained after delay alignment that are of the current frame, a solution determining unit, configured to determine a channel combination solution of the current frame based on the left channel time domain signal obtained after delay alignment and the right channel time domain signal obtained after delay alignment that are of the current frame, where the channel combination solution may include a near in-phase signal channel combination solution or a near out-of-phase signal channel combination solution, a factor obtaining unit, configured to obtain a quantized channel combination ratio factor of the current frame and an encoding index of the quantized channel combination ratio factor based on the determined channel combination solution of the current frame, and the left channel time domain signal obtained after delay alignment and the right channel time domain signal obtained after delay alignment that are of the current frame, where methods for obtaining a quantized channel combination ratio factor and an encoding index of the quantized channel combination ratio factor that are corresponding to the near in-phase signal channel combination solution and the near out-of-phase signal channel combination solution are different, a mode determining unit, configured to determine an encoding mode of the current frame based on the determined channel combination solution of the current frame, a signal obtaining unit, configured to downmix, based on the encoding mode of the current frame and the quantized channel combination ratio factor of the current frame, the left channel time domain signal obtained after delay alignment and the right channel time domain signal obtained after delay alignment that are of the current frame, to obtain a primary channel signal and a secondary channel signal of the current frame, and an encoding unit, configured to encode the primary channel signal and the secondary channel signal of the current frame.

With reference to the third aspect, in an implementation of the third aspect, the solution determining unit may be configured to determine a signal type of the current frame based on the left channel time domain signal obtained after delay alignment and the right channel time domain signal obtained after delay alignment that are of the current frame, where the signal type includes a near in-phase signal or a near out-of-phase signal, and correspondingly determine the channel combination solution of the current frame at least based on the signal type of the current frame, where the channel combination solution includes a near out-of-phase signal channel combination solution used for processing a near out-of-phase signal or a near in-phase signal channel combination solution used for processing a near in-phase signal.

With reference to the third aspect or the foregoing implementation of the third aspect, in an implementation of the third aspect, if the channel combination solution of the current frame is the near out-of-phase signal channel combination solution used for processing a near out-of-phase signal, the factor obtaining unit may be configured to obtain an amplitude correlation difference parameter between the left channel time domain signal that is obtained after long-term smoothing and that is of the current frame and the right channel time domain signal that is obtained after long-term smoothing and that is of the current frame based on the left channel time domain signal obtained after delay alignment and the right channel time domain signal obtained after delay alignment that are of the current frame, convert the amplitude correlation difference parameter into a channel combination ratio factor of the current frame, and quantize the channel combination ratio factor of the current frame, to obtain the quantized channel combination ratio factor of the current frame and the encoding index of the quantized channel combination ratio factor.

With reference to any one of the third aspect or the implementations of the third aspect, in an implementation of the third aspect, when obtaining the amplitude correlation difference parameter between the left channel time domain signal obtained after long-term smoothing and the right channel time domain signal obtained after long-term smoothing that are of the current frame based on the left channel time domain signal obtained after delay alignment and the right channel time domain signal obtained after delay alignment that are of the current frame, the factor obtaining unit may be configured to determine a reference channel signal of the current frame based on the left channel time domain signal obtained after delay alignment and the right channel time domain signal obtained after delay alignment that are of the current frame, calculate a left channel amplitude correlation parameter between the left channel time domain signal that is obtained after delay alignment and that is of the current frame and the reference channel signal, and a right channel amplitude correlation parameter between the right channel time domain signal that is obtained after delay alignment and that is of the current frame and the reference channel signal, and calculate the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter.

With reference to any one of the third aspect or the implementations of the third aspect, in an implementation of the third aspect, when calculating the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter, the factor obtaining unit may be configured to determine an amplitude correlation parameter between the left channel time domain signal that is obtained after long-term smoothing and that is of the current frame and the reference channel signal based on the left channel amplitude correlation parameter, determine an amplitude correlation parameter between the right channel time domain signal that is obtained after long-term smoothing and that is of the current frame and the reference channel signal based on the right channel amplitude correlation parameter, and determine the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal.

With reference to any one of the third aspect or the implementations of the third aspect, in an implementation of the third aspect, when determining the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal, the factor obtaining unit may be configured to determine the amplitude correlation difference parameter between the left channel time domain signal obtained after long-term smoothing and the right channel time domain signal obtained after long-term smoothing that are of the current frame using the following formula:

$$\text{diff\_lt\_corr}=\text{tdm\_lt\_corr\_}LM\_SM_{cur}-\text{tdm\_lt\_corr\_}RM\_SM_{cur},$$

where diff_lt_corr is the amplitude correlation difference parameter between the left channel time domain signal obtained after long-term smoothing and the right channel time domain signal obtained after long-term smoothing that are of the current frame, $\text{tdm\_lt\_corr\_LM\_SM}_{cur}$ is the amplitude correlation parameter between the left channel time domain signal that is obtained after long-term smoothing and that is of the current frame and the reference channel signal, and $\text{tdm\_lt\_corr\_RM\_SM}_{cur}$ is the amplitude correlation parameter between the right channel time domain signal that is obtained after long-term smoothing and that is of the current frame and the reference channel signal.

With reference to any one of the third aspect or the implementations of the third aspect, in an implementation of the third aspect, when determining the amplitude correlation parameter between the left channel time domain signal that is obtained after long-term smoothing and that is of the current frame and the reference channel signal based on the left channel amplitude correlation parameter, the factor obtaining unit may be configured to determine the amplitude correlation parameter $\text{tdm\_lt\_corr\_LM\_SM}_{cur}$ between the left channel time domain signal that is obtained after long-term smoothing and that is of the current frame and the reference channel signal using the following formula:

$$\text{tdm\_lt\_corr\_}LM\_SM_{cur}=\alpha*\text{tdm\_lt\_corr\_}LM\_SM_{pre}+(1-\alpha)\text{corr\_}LM,$$

where $\text{tdm\_lt\_corr\_LM\_SM}_{pre}$ is an amplitude correlation parameter between a left channel time domain signal that is obtained after long-term smoothing and that is of a previous frame of the current frame and the reference channel signal, a is a smoothing factor, a value range of a is [0, 1], and corr_LM is the left channel amplitude correlation parameter, and the determining an amplitude correlation parameter between the right channel time domain signal that is obtained after long-term smoothing and that is of the current frame and the reference channel signal based on the right channel amplitude correlation parameter includes determining the amplitude correlation parameter $\text{tdm\_lt\_corr\_RM\_SM}_{cur}$ between the right channel time domain signal that is obtained after long-term smoothing and that is of the current frame and the reference channel signal using the following formula:

$$\text{tdm\_lt\_corr\_}RM\_SM_{cur}=\beta*\text{tdm\_lt\_corr\_}RM\_SM_{pre}+(1-\beta)\text{corr\_}LM,$$

where $\text{tdm\_lt\_corr\_RM\_SM}_{pre}$ is an amplitude correlation parameter between a right channel time domain signal that is obtained after long-term smoothing and that is of the previous frame of the current frame and the reference channel signal, β is a smoothing factor, a value range of β is [0, 1], and corr_RM is the right channel amplitude correlation parameter.

With reference to any one of the third aspect or the implementations of the third aspect, in an implementation of the third aspect, when calculating the left channel amplitude correlation parameter between the left channel time domain signal that is obtained after delay alignment and that is of the current frame and the reference channel signal, and the right channel amplitude correlation parameter between the right channel time domain signal that is obtained after delay alignment and that is of the current frame and the reference channel signal, the factor obtaining unit may be configured to determine the left channel amplitude correlation parameter corr_LM between the left channel time domain signal that is obtained after delay alignment and that is of the current frame and the reference channel signal using the following formula:

$$\text{corr\_LM}=\frac{\sum_{n=0}^{N-1}|x'_L(n)|*|\text{mono\_i}(n)|}{\sum_{n=0}^{N-1}|\text{mono\_i}(n)|*|\text{mono\_i}(n)|},$$

where $x'_L(n)$ is the left channel time domain signal that is obtained after delay alignment and that is of the current frame, N is a frame length of the current frame, and mono_i(n) is the reference channel signal, and determine the right channel amplitude correlation parameter corr_RM between the right channel time domain signal that is obtained after delay alignment and that is of the current frame and the reference channel signal using the following formula:

$$\text{corr\_RM} = \frac{\sum_{n=0}^{N-1} |x'_R(n)| * |\text{mono\_i}(n)|}{\sum_{n=0}^{N-1} |\text{mono\_i}(n)| * |\text{mono\_i}(n)|},$$

where $x'_R(n)$ is the right channel time domain signal that is obtained after delay alignment and that is of the current frame.

With reference to any one of the third aspect or the implementations of the third aspect, in an implementation of the third aspect, when converting the amplitude correlation difference parameter into the channel combination ratio factor of the current frame, the factor obtaining unit may be configured to perform mapping processing on the amplitude correlation difference parameter to obtain a mapped amplitude correlation difference parameter, where a value of the mapped amplitude correlation difference parameter is within a preset amplitude correlation difference parameter value range, and convert the mapped amplitude correlation difference parameter into the channel combination ratio factor of the current frame.

With reference to any one of the third aspect or the implementations of the third aspect, in an implementation of the third aspect, when performing mapping processing on the amplitude correlation difference parameter, the factor obtaining unit may be configured to perform amplitude limiting on the amplitude correlation difference parameter, to obtain an amplitude correlation difference parameter obtained after amplitude limiting, where the amplitude limiting may be segmented amplitude limiting or non-segmented amplitude limiting, and the amplitude limiting may be linear amplitude limiting or non-linear amplitude limiting, and map the amplitude correlation difference parameter obtained after amplitude limiting, to obtain the mapped amplitude correlation difference parameter, where the mapping may be segmented mapping or non-segmented mapping, and the mapping may be linear mapping or non-linear mapping.

With reference to any one of the third aspect or the implementations of the third aspect, in an implementation of the third aspect, when performing amplitude limiting on the amplitude correlation difference parameter, to obtain the amplitude correlation difference parameter obtained after amplitude limiting, the factor obtaining unit may be configured to perform amplitude limiting on the amplitude correlation difference parameter using the following formula:

$$\text{diff\_lt\_corr\_limit} = \begin{cases} \text{RATIO\_MAX}, & \text{when diff\_lt\_corr} > \text{RATIO\_MAX} \\ \text{diff\_lt\_corr}, & \text{in other cases} \\ \text{RATIO\_MIN}, & \text{when diff\_lt\_corr} < \text{RATIO\_MIN} \end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting, RATIO_MIN is a minimum value of the amplitude correlation difference parameter obtained after amplitude limiting, and RATIO_MAX>RATIO_MIN, and for values of RATIO_MAX and RATIO_MIN, refer to the foregoing description, and details are not described again.

With reference to any one of the third aspect or the implementations of the third aspect, in an implementation of the third aspect, when performing amplitude limiting on the amplitude correlation difference parameter, to obtain the amplitude correlation difference parameter obtained after amplitude limiting, the factor obtaining unit may be configured to perform amplitude limiting on the amplitude correlation difference parameter using the following formula:

$$\text{diff\_lt\_corr\_limit} = \begin{cases} \text{RATIO\_MAX}, & \text{when diff\_lt\_corr} > \text{RATIO\_MAX} \\ \text{diff\_lt\_corr}, & \text{in other cases} \\ -\text{RATIO\_MAX}, & \text{when diff\_lt\_corr} < -\text{RATIO\_MIN} \end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting.

With reference to any one of the third aspect or the implementations of the third aspect, in an implementation of the third aspect, when mapping the amplitude correlation difference parameter obtained after amplitude limiting, to obtain the mapped amplitude correlation difference parameter, the factor obtaining unit may be configured to map the amplitude correlation difference parameter using the following formula:

$$\text{diff\_lt\_corr\_map} = \begin{cases} A_1 * \text{diff\_lt\_corr\_limit} + B_1, & \text{when diff\_lt\_corr\_limit} > \text{RATIO\_HIGH} \\ A_2 * \text{diff\_lt\_corr\_limit} + B_2, & \text{when diff\_lt\_corr\_limit} < \text{RATIO\_LOW} \\ A_3 * \text{diff\_lt\_corr\_limit} + B_3, & \text{when RATIO\_LOW} \le \text{diff\_lt\_corr\_limit} \le \text{RATIO\_HIGH} \end{cases},$$

$$A_1 = \frac{\text{MAP\_MAX} - \text{MAP\_HIGH}}{\text{RATIO\_MAX} - \text{RATIO\_HIGH}},$$

$$B_1 = \text{MAP\_MAX} - \text{RATIO\_MAX} * A_1 \text{ or } B_1 = \text{MAP\_HIGH} - \text{RATIO\_HIGH} * A_1,$$

$$A_2 = \frac{\text{MAP\_LOW} - \text{MAP\_MIN}}{\text{RATIO\_LOW} - \text{RATIO\_MIN}},$$

$$B_2 = \text{MAP\_LOW} - \text{RATIO\_MAX} * A_2 \text{ or } B_2 = \text{MAP\_MIN} - \text{RATIO\_MIN} * A_2,$$

$$A_3 = \frac{\text{MAP\_HIGH} - \text{MAP\_LOW}}{\text{RATIO\_HIGH} - \text{RATIO\_LOW}},$$

$$B_2 = \text{MAP\_HIGH} - \text{RATIO\_HIGH} * A_3 \text{ or } B_3 = \text{MAP\_LOW} - \text{RATIO\_LOW} * A_3,$$

where diff_lt_corr_limit is the amplitude correlation difference parameter obtained after amplitude limiting, diff_lt_corr_map is the mapped amplitude correlation difference parameter, MAP_MAX is a maximum value of the mapped amplitude correlation difference parameter, MAP_HIGH is a high threshold of a value of the mapped amplitude correlation difference parameter, MAP_LOW is a low threshold of a value of the mapped amplitude correlation difference parameter, MAP_MIN is a minimum value of the mapped amplitude correlation difference parameter, MAP_MAX>MAP_HIGH>MAP_LOW>MAP_MIN and for specific values of MAP_MAX, MAP_HIGH, MAP_LOW, and MAP_MIN, refer to the foregoing description, and details are not described again, and RATIO_MAX is a maximum value of the amplitude correlation difference parameter obtained after amplitude limiting, RATIO_HIGH is a high threshold of the amplitude correlation difference parameter obtained after amplitude limiting, RATIO_LOW is a low threshold of the amplitude correlation difference parameter obtained after amplitude limiting, RATIO_MIN is a minimum value of the amplitude correlation difference parameter obtained after amplitude limiting, RATIO_MAX>RATIO_HIGH>RATIO_LOW>RATIO_MIN, and for values of RATIO_HIGH and RATIO_LOW, refer to the foregoing description, and details are not described again.

With reference to any one of the third aspect or the implementations of the third aspect, in an implementation of the third aspect, when mapping the amplitude correlation difference parameter obtained after amplitude limiting, to obtain the mapped amplitude correlation difference parameter, the factor obtaining unit may be configured to map the amplitude correlation difference parameter using the following formula:

$$\text{diff\_lt\_corr\_map} = \begin{cases} 1.08 * \text{diff\_lt\_corr\_limit} + 0.38, & \text{when diff\_lt\_corr\_limit} > 0.5 * \text{RATIO\_MAX} \\ 0.64 * \text{diff\_lt\_corr\_limit} + 1.28, & \text{when diff\_lt\_corr\_limit} < -0.5 * \text{RATIO\_MAX} \\ 0.26 * \text{diff\_lt\_corr\_limit} + 0.995, & \text{in other cases} \end{cases}$$

where diff_lt_corr_map is the mapped amplitude correlation difference parameter, diff_lt_corr_limit is the amplitude correlation difference parameter obtained after amplitude limiting, and RATIO_MAX is a maximum value of the amplitude correlation difference parameter obtained after amplitude limiting.

With reference to any one of the third aspect or the implementations of the third aspect, in an implementation of the third aspect, when mapping the amplitude correlation difference parameter obtained after amplitude limiting, to obtain the mapped amplitude correlation difference parameter, the factor obtaining unit may be configured to map the amplitude correlation difference parameter using the following formula:

$$\text{diff\_lt\_corr\_map} = a * b^{\text{diff\_lt\_corr\_limit}} + c,$$

where diff_lt_corr_map is the mapped amplitude correlation difference parameter, diff_lt_corr_limit is the amplitude correlation difference parameter obtained after amplitude limiting, a value range of a is [0, 1], a value range of b is [1.5, 3], and a value range of c is [0, 0.5].

With reference to any one of the third aspect or the implementations of the third aspect, in an implementation of the third aspect, when mapping the amplitude correlation difference parameter obtained after amplitude limiting, to obtain the mapped amplitude correlation difference parameter, the factor obtaining unit may be configured to map the amplitude correlation difference parameter using the following formula:

$$\text{diff\_lt\_corr\_map} = a * (\text{diff\_lt\_corr\_limit} + 1.5)^2 + b * (\text{diff\_lt\_corr\_limit} + 1.5) + c,$$

where diff_lt_corr_map is the mapped amplitude correlation difference parameter, diff_lt_corr_limit is the amplitude correlation difference parameter obtained after amplitude limiting, a value range of a is [0.08, 0.12], a value range of b is [0.03, 0.07], and a value range of c is [0.1, 0.3].

With reference to any one of the third aspect or the implementations of the third aspect, in an implementation of the third aspect, when converting the mapped amplitude correlation difference parameter into the channel combination ratio factor of the current frame, the factor obtaining unit may be configured to convert the mapped amplitude correlation difference parameter into the channel combination ratio factor of the current frame using the following formula:

$$\text{ratio\_SM} = \frac{1 - \cos\left(\frac{\pi}{2} * \text{diff\_lt\_corr\_map}\right)}{2},$$

where ratio_SM is the channel combination ratio factor of the current frame, and diff_lt_corr_map is the mapped amplitude correlation difference parameter.

A fourth aspect of the present disclosure provides a computer storage medium, configured to store an executable instruction, where when the executable instruction is executed, any method in the first aspect and the possible implementations of the first aspect may be implemented.

A fifth aspect of the present disclosure provides a computer program, where when the computer program is executed, any method in the first aspect and the possible implementations of the first aspect may be implemented.

The stereo encoders provided in the second aspect of the present disclosure may be a mobile phone, a personal computer, a tablet computer, or a wearable device.

Any one of the stereo encoders provided in the third aspect of the present disclosure and the possible implementations of the third aspect may be a mobile phone, a personal computer, a tablet computer, or a wearable device.

It can be learned from the foregoing technical solutions provided in the embodiments of the present disclosure that, when stereo encoding is performed in the embodiments of the present disclosure, the channel combination encoding solution of the current frame is first determined, and then the quantized channel combination ratio factor of the current frame and the encoding index of the quantized channel combination ratio factor are obtained based on the determined channel combination encoding solution, so that the obtained primary channel signal and secondary channel signal of the current frame meet a characteristic of the current frame, it is ensured that a sound image of a synthesized stereo audio signal obtained after encoding is stable, drift phenomena are reduced, and encoding quality is improved.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 10:
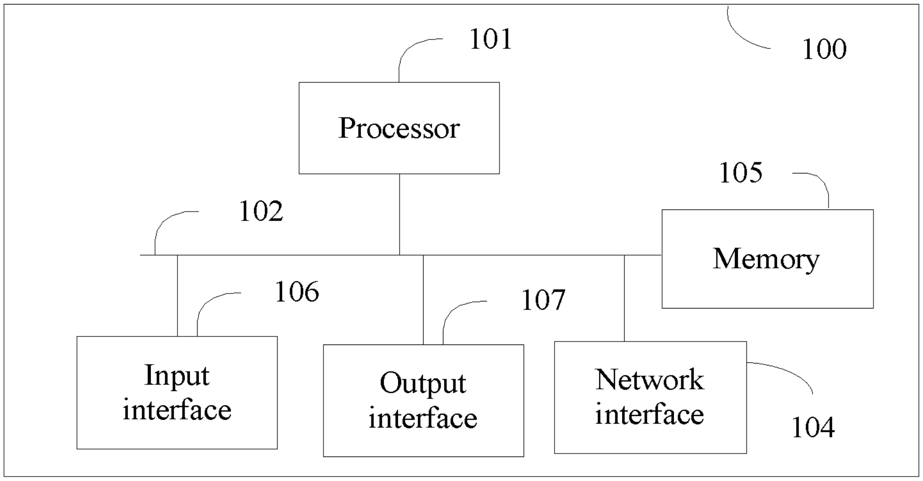
FIG. 10 is a structural diagram of a computer according to an embodiment of the present disclosure.

A stereo encoding method provided in the embodiments of the present disclosure may be implemented using a computer. In an embodiment, the stereo encoding method may be implemented using a personal computer, a tablet computer, a mobile phone, a wearable device, or the like. Special hardware may be installed on a computer to implement the stereo encoding method provided in the embodiments of the present disclosure, or special software may be installed to implement the stereo encoding method provided in the embodiments of the present disclosure. In an implementation, a structure of a computer 100 for implementing the stereo encoding method provided in the embodiments of the present disclosure is shown in FIG. 10, and includes at least one processor 101, at least one network interface 104, a memory 105, and at least one communications bus 102 configured to implement connection and communication between these apparatuses. The processor 101 is configured to execute an executable module stored in the memory 105 to implement a stereo encoding method in the present disclosure. The executable module may be a computer program. According to a function of the computer 100 in a system and an application scenario of the stereo encoding method, the computer 100 may further include at least one input interface 106 and at least one output interface 107.

In the embodiments of the present disclosure, a current frame of a stereo audio signal includes a left channel time domain signal and a right channel time domain signal. The left channel time domain signal is denoted as $x_L(n)$, the right channel time domain signal is denoted as $x_R(n)$, n is a sample number, n=0, 1, . . . , N−1, and N is a frame length. The frame length varies based on different sampling rates and different lengths of signal duration. For example, if a sampling rate of a stereo audio signal is 16 Kilohertz (KHz), and time duration of a signal of one frame is 20 milliseconds (ms), the frame length N=320, that is, the frame length is 320 samples.

Figure 1:
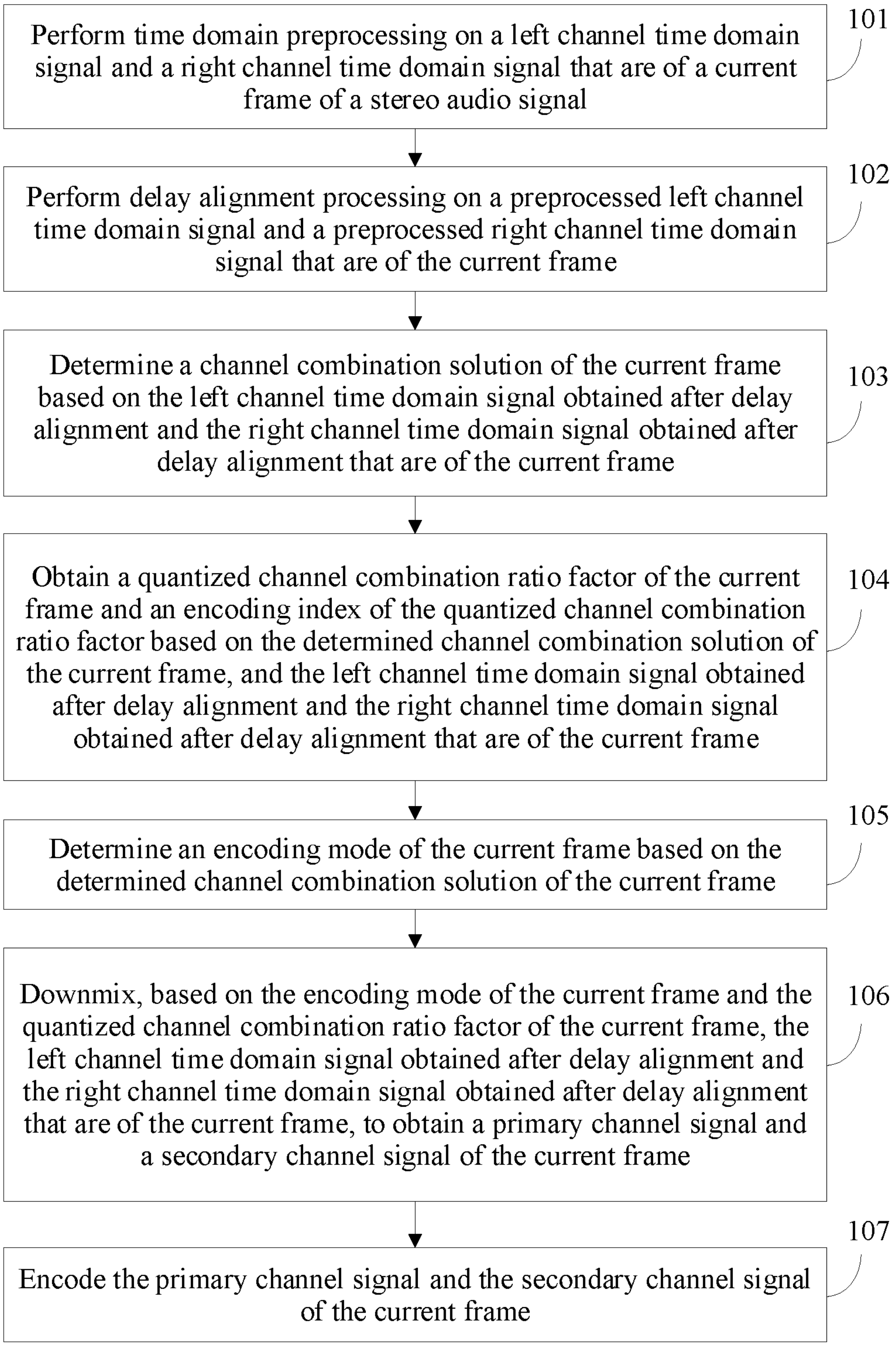
FIG. 1 is a flowchart of a stereo encoding method according to an embodiment of the present disclosure.

A procedure of a stereo encoding method provided in an embodiment of the present disclosure is shown in FIG. 1, and includes the following steps.

101. Perform time domain preprocessing on a left channel time domain signal and a right channel time domain signal that are of a current frame of a stereo audio signal, to obtain a preprocessed left channel time domain signal and a preprocessed right channel time domain signal that are of the current frame.

The time domain preprocessing may be filtering processing or another known time domain preprocessing manner. A specific manner of time domain preprocessing is not limited in the present disclosure.

For example, in an implementation, the time domain preprocessing is high-pass filtering processing, and a signal obtained after the high-pass filtering processing is the preprocessed left channel time domain signal and the preprocessed right channel time domain signal that are of the current frame and that are obtained. For example, the preprocessed left channel time domain signal of the current frame may be denoted as $x_{L\_HP}(n)$, and the preprocessed right channel time domain signal of the current frame may be denoted as $x_{R\_HP}(n)$.

102. Perform delay alignment processing on the preprocessed left channel time domain signal and the preprocessed right channel time domain signal that are of the current frame, to obtain the left channel time domain signal obtained after delay alignment and the right channel time domain signal obtained after delay alignment that are of the current frame.

Delay alignment is a processing method commonly used in stereo audio signal processing. There is a plurality of implementation methods for delay alignment. A specific delay alignment method is not limited in this embodiment of the present disclosure.

In an implementation, an inter-channel delay parameter may be extracted based on the preprocessed left channel time domain signal and right channel time domain signal that are of the current frame, the extracted inter-channel delay parameter is quantized, and then delay alignment processing is performed on the preprocessed left channel time domain signal and the preprocessed right channel time domain signal that are of the current frame based on the quantized inter-channel delay parameter. The left channel time domain signal that is obtained after delay alignment and that is of the current frame may be denoted as $x'_L(n)$ and the right channel time domain signal that is obtained after delay alignment and that is of the current frame may be denoted as $x'_R(n)$. The inter-channel delay parameter may include at least one of an inter-channel time difference or an inter-channel phase difference.

In another implementation, a time-domain cross-correlation function between left and right channels may be calculated based on the preprocessed left channel time domain signal and right channel time domain signal of the current frame, then an inter-channel delay difference is determined based on a maximum value of the time-domain cross-correlation function, and after the determined inter-channel delay difference is quantized, based on the quantized inter-channel delay difference, one audio channel signal is selected as a reference, and a delay adjustment is performed on the other audio channel signal, so as to obtain the left channel time domain signal and the right channel time domain signal that are obtained after delay alignment and that are of the current frame. The selected audio channel signal may be the preprocessed left channel time domain signal of the current frame or the preprocessed right channel time domain signal of the current frame.

103. Determine a channel combination solution of the current frame based on the left channel time domain signal obtained after delay alignment and the right channel time domain signal obtained after delay alignment that are of the current frame.

In an implementation, the current frame may be classified into a near out-of-phase signal or a near in-phase signal based on different phase differences between a left channel time domain signal obtained after long-term smoothing and a right channel time domain signal obtained after long-term smoothing that undergo delay alignment and that are of the current frame. Processing of the near in-phase signal and processing of the near out-of-phase signal may be different. Therefore, based on different processing of the near out-of-phase signal and the near in-phase signal, two channel combination solutions may be selected for channel combination of the current frame a near in-phase signal channel combination solution for processing the near in-phase signal and a near out-of-phase signal channel combination solution for processing the near out-of-phase signal.

In an embodiment, a signal type of the current frame may be determined based on the left channel time domain signal obtained after delay alignment and the right channel time domain signal obtained after delay alignment that are of the current frame, where the signal type includes a near in-phase signal or a near out-of-phase signal, and then the channel combination solution of the current frame is determined at least based on the signal type of the current frame.

It may be understood that, in some implementations, a corresponding channel combination solution may be directly selected based on the signal type of the current frame. For example, when the current frame is a near in-phase signal, a near in-phase signal channel combination solution is directly selected, or when the current frame is a near out-of-phase signal, a near out-of-phase signal channel combination solution is directly selected.

In some other implementations, when the channel combination solution of the current frame is selected, in addition to the signal type of the current frame, reference may be made to at least one of a signal characteristic of the current frame, signal types of previous K frames of the current frame, or signal characteristics of the previous K frames of the current frame. The signal characteristic of the current frame may include at least one of a difference signal between the left channel time domain signal that is obtained after delay alignment and that is of the current frame and the right channel time domain signal that is obtained after delay alignment and that is of the current frame, a signal energy ratio of the current frame, a signal-to-noise ratio of the left channel time domain signal that is obtained after delay alignment and that is of the current frame, a signal-to-noise ratio of the right channel time domain signal that is obtained after delay alignment and that is of the current frame, or the like. It may be understood that the previous K frames of the current frame may include a previous frame of the current frame, may further include a previous frame of the previous frame of the current frame, and the like. A value of K is an integer not less than 1, and the previous K frames may be consecutive in time domain, or may be inconsecutive in time domain. The signal characteristics of the previous K frames of the current frame are similar to the signal characteristic of the current frame. Details are not described again.

104. Obtain a quantized channel combination ratio factor of the current frame and an encoding index of the quantized channel combination ratio factor based on the determined channel combination solution of the current frame, and the left channel time domain signal obtained after delay alignment and the right channel time domain signal obtained after delay alignment that are of the current frame.

When the determined channel combination solution is a near in-phase signal channel combination solution, the quantized channel combination ratio factor of the current frame and the encoding index of the quantized channel combination ratio factor are obtained based on the near in-phase signal channel combination solution. When the determined channel combination solution is a near out-of-phase signal channel combination solution, the quantized channel combination ratio factor of the current frame and the encoding index of the quantized channel combination ratio factor are obtained based on the near out-of-phase signal channel combination solution.

A process of obtaining the quantized channel combination ratio factor of the current frame and the encoding index of the quantized channel combination ratio factor is described in detail later.

105. Determine an encoding mode of the current frame based on the determined channel combination solution of the current frame.

The encoding mode of the current frame may be determined in at least two preset encoding modes. A quantity of preset encoding modes and encoding processing manners corresponding to the preset encoding modes may be set and adjusted as required. The quantity of preset encoding modes and the specific encoding processing manners corresponding to the preset encoding modes are not limited in this embodiment of the present disclosure.

In an implementation, a correspondence between a channel combination solution and an encoding mode may be preset. After the channel combination solution of the current frame is determined, the encoding mode of the current frame may be directly determined based on the preset correspondence.

In another implementation, an algorithm for determining a channel combination solution and an encoding mode may be preset. An input parameter of the algorithm includes at least a channel combination solution. After the channel combination solution of the current frame is determined, the encoding mode of the current frame may be determined based on the preset algorithm. The input of the algorithm may further include some characteristics of the current frame and characteristics of previous frames of the current frame. The previous frames of the current frame may include at least a previous frame of the current frame, and the previous frames of the current frame may be consecutive in time domain or may be inconsecutive in time domain.

106. Downmix, based on the encoding mode of the current frame and the quantized channel combination ratio factor of the current frame, the left channel time domain signal obtained after delay alignment and the right channel time domain signal obtained after delay alignment that are of the current frame, to obtain a primary channel signal and a secondary channel signal of the current frame.

Different encoding modes may correspond to different downmixing processing, and during downmixing, the quantized channel combination ratio factor may be used as a parameter for downmixing processing. The downmixing processing may be performed in any one of a plurality of existing downmixing manners, and a specific downmixing processing manner is not limited in this embodiment of the present disclosure.

107. Encode the primary channel signal and the secondary channel signal of the current frame.

An encoding process may be performed in any existing encoding mode, and a specific encoding method is not limited in this embodiment of the present disclosure. It may be understood that, when the primary channel signal and the secondary channel signal of the current frame are being encoded, the primary channel signal and the secondary channel signal of the current frame may be directly encoded, or the primary channel signal and the secondary channel signal of the current frame may be processed, and then a processed primary channel signal and secondary channel signal of the current frame are encoded, or an encoding index of the primary channel signal and an encoding index of the secondary channel signal may be encoded.

It can be learned from the foregoing description that, when stereo encoding is performed in this embodiment, the channel combination encoding solution of the current frame is first determined, and then the quantized channel combination ratio factor of the current frame and the encoding index of the quantized channel combination ratio factor are obtained based on the determined channel combination encoding solution, so that the obtained primary channel signal and secondary channel signal of the current frame meet a characteristic of the current frame, it is ensured that a sound image of a synthesized stereo audio signal obtained after encoding is stable, drift phenomena are reduced, and encoding quality is improved.

Figure 2:
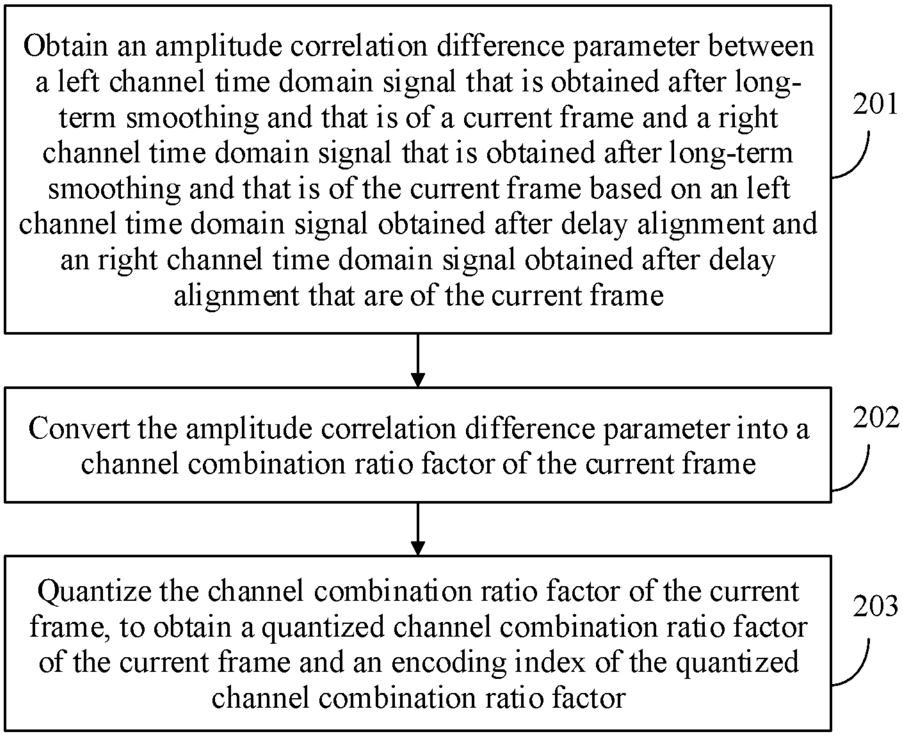
FIG. 2 is a flowchart of a method for obtaining a channel combination ratio factor and an encoding index according to an embodiment of the present disclosure.

FIG. 2 describes a procedure of a method for obtaining the quantized channel combination ratio factor of the current frame and the encoding index of the quantized channel combination ratio factor according to an embodiment of the present disclosure. The method may be performed when the channel combination solution of the current frame is a near out-of-phase signal channel combination solution used for processing a near out-of-phase signal, and the method may be used as an implementation of step 104.

201. Obtain an amplitude correlation difference parameter between the left channel time domain signal that is obtained after long-term smoothing and that is of the current frame and the right channel time domain signal that is obtained after long-term smoothing and that is of the current frame based on the left channel time domain signal obtained after delay alignment and the right channel time domain signal obtained after delay alignment that are of the current frame.

Figure 3:
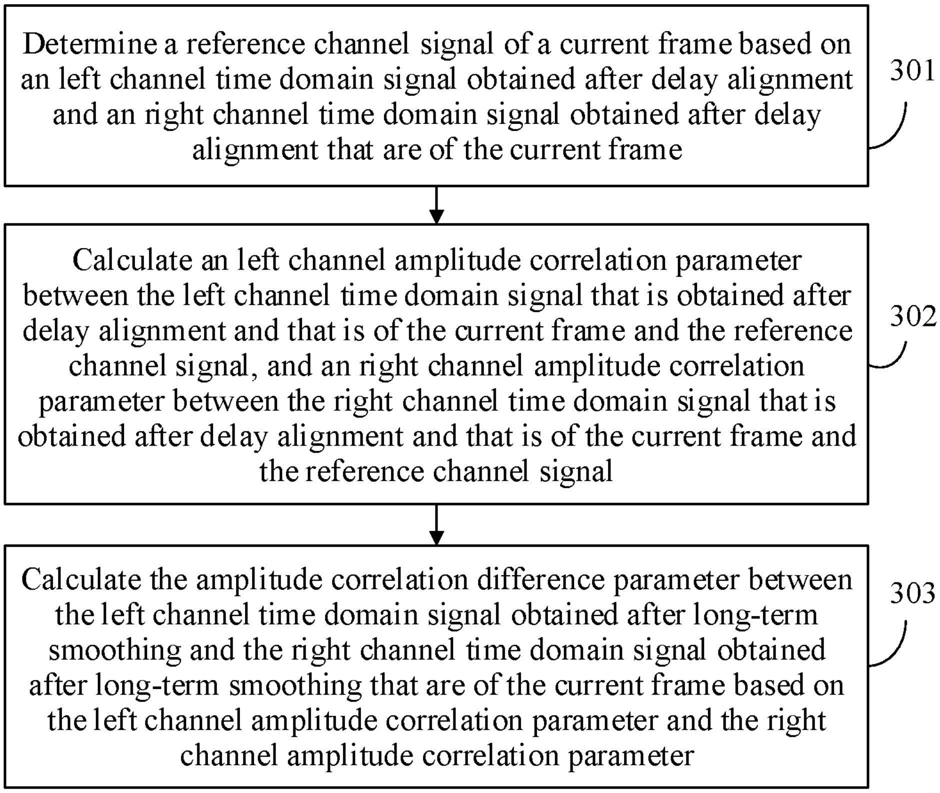
FIG. 3 is a flowchart of a method for obtaining an amplitude correlation difference parameter according to an embodiment of the present disclosure.

In an implementation, a specific implementation of step 201 may be shown in FIG. 3, and includes the following steps.

301. Determine a reference channel signal of the current frame based on the left channel time domain signal obtained after delay alignment and the right channel time domain signal obtained after delay alignment that are of the current frame.

The reference channel signal may also be referred to as a mono signal.

In an implementation, the reference channel signal mono-J(n) of the current frame may be obtained using the following formula:

$$\text{mono\_i}(n) = \frac{x'_L(i) - x'_R(i)}{2}.$$

302. Calculate a left channel amplitude correlation parameter between the left channel time domain signal that is obtained after delay alignment and that is of the current frame and the reference channel signal, and a right channel amplitude correlation parameter between the right channel time domain signal that is obtained after delay alignment and that is of the current frame and the reference channel signal.

In an implementation, the amplitude correlation parameter corr_LM between the left channel time domain signal that is obtained after delay alignment and that is of the current frame and the reference channel signal may be obtained using the following formula:

$$\text{corr\_LM} = \frac{\sum_{n=0}^{N-1} |x'_L(n)| * |\text{mono\_i}(n)|}{\sum_{n=0}^{N-1} |\text{mono\_i}(n)| * |\text{mono\_i}(n)|},$$

In an implementation, the amplitude correlation parameter corr_RM between the right channel time domain signal that is obtained after delay alignment and that is of the current frame and the reference channel signal may be obtained using the following formula:

$$\text{corr\_RM} = \frac{\sum_{n=0}^{N-1} |x'_R(n)| * |\text{mono\_i}(n)|}{\sum_{n=0}^{N-1} |\text{mono\_i}(n)| * |\text{mono\_i}(n)|},$$

where

|●| indicates obtaining an absolute value.

303. Calculate the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter.

In an implementation, the amplitude correlation difference parameter diff_lt_corr between the left channel time domain signal and the right channel time domain signal that are obtained after long-term smoothing and that are of the current frame may be calculated in the following manner. An amplitude correlation parameter $\text{tdm\_lt\_corr\_LM\_SM}_{cur}$ between the left channel time domain signal that is obtained after long-term smoothing and that is of the current frame and the reference channel signal is determined based on corr_LM, and an amplitude correlation parameter $\text{tdm\_lt\_corr\_RM\_SM}_{cur}$ between the right channel time domain signal that is obtained after long-term smoothing and that is of the current frame and the reference channel signal is determined based on corr_RM, where a specific process of obtaining $\text{tdm\_lt\_corr\_LM\_SM}_{cur}$ and $tdm\_lt\_corr\_RM\_SM_{cur}$ is not limited in this embodiment of the present disclosure, and in addition to the obtaining manner provided in this embodiment of the present disclosure, other approaches that can be used to obtain $tdm\_lt\_corr\_LM\_SM_{cur}$ and $tdm\_lt\_corr\_RM\_SM_{cur}$ may be used, and the amplitude correlation difference parameter diff_lt_corr between the left channel time domain signal and the right channel time domain signal that are obtained after long-term smoothing and that are of the current frame is calculated based $tdm\_lt\_corr\_LM\_SM_{cur}$ and $tdm\_lt\_corr\_RM\_SM_{cur}$, where in an implementation, diff_lt_corr may be obtained using the following formula:

$$diff\_lt\_corr=tdm\_lt\_corr\_LM\_SM_{cur}-tdm\_lt\_corr\_RM\_SM_{cur}.$$

202. Convert the amplitude correlation difference parameter into a channel combination ratio factor of the current frame.

The amplitude correlation difference parameter may be converted into the channel combination ratio factor of the current frame using a preset algorithm. For example, in an implementation, mapping processing may be first performed on the amplitude correlation difference parameter to obtain a mapped amplitude correlation difference parameter, where a value of the mapped amplitude correlation difference parameter is within a preset amplitude correlation difference parameter value range, and then, the mapped amplitude correlation difference parameter is converted into the channel combination ratio factor of the current frame.

In an implementation, the mapped amplitude correlation difference parameter may be converted into the channel combination ratio factor of the current frame using the following formula:

$$ratio\_SM=\frac{1-\cos\left(\frac{\pi}{2}*diff\_lt\_corr\_map\right)}{2},$$

where diff_lt_corr_map indicates the mapped amplitude correlation difference parameter, ratio-M indicates the channel combination ratio factor of the current frame, and cos(●) indicates a cosine operation.

203. Quantize the channel combination ratio factor of the current frame, to obtain the quantized channel combination ratio factor of the current frame and the encoding index of the quantized channel combination ratio factor.

Quantization and encoding are performed on the channel combination ratio factor of the current frame, so that an initial encoding index ratio_idx_init_SM that is corresponding to the near out-of-phase signal channel combination solution of the current frame and that is obtained after quantization and encoding, and an initial value $ratio\_init\_SM_{qua}$ of a channel combination ratio factor that is corresponding to the near out-of-phase signal channel combination solution of the current frame and that is obtained after quantization and encoding may be obtained. In an implementation, ratio_idx_init_SM and $ratio\_init\_SM_{qua}$ meet the following relationship:

$$ratio\_init\_SM_{qua}=ratio\_tabl\_SM[ratio\_idx\_init\_SM],$$

where ratio_tabl_SM is a codebook for scalar quantization of the channel combination ratio factor corresponding to the near out-of-phase signal channel combination solution.

It should be noted that, when quantization and encoding are performed on the channel combination ratio factor of the current frame, any scalar quantization method may be used, for example, uniform scalar quantization or non-uniform scalar quantization. In an implementation, a quantity of bits for encoding during quantization and encoding may be 5 bits, 4 bits, 6 bits, or the like. A specific quantization method is not limited in the present disclosure.

In an implementation, the amplitude correlation parameter $tdm\_lt\_corr\_LM\_SM_{cur}$ between the left channel time domain signal that is obtained after long-term smoothing and that is of the current frame and the reference channel signal may be determined using the following formula:

$$tdm\_lt\_corr\_LM\_SM_{cur}=\alpha*tdm\_lt\_corr\_LM\_SM_{pre}+(1-\alpha)corr\_LM,$$

where $tdm\_lt\_corr\_LM\_SM_{cur}$ is an amplitude correlation parameter between a left channel time domain signal that is obtained after long-term smoothing and that is of a previous frame of the current frame and the reference channel signal, a is a smoothing factor, a value range of α is [0, 1], and corr_LM is the left channel amplitude correlation parameter.

Correspondingly, the amplitude correlation parameter $tdm\_lt\_corr\_RM\_SM_{cur}$ between the right channel time domain signal that is obtained after long-term smoothing and that is of the current frame and the reference channel signal may be determined using the following formula:

$$tdm\_lt\_corr\_RM\_SM_{cur}=\beta*tdm\_lt\_corr\_RM\_SM_{pre}+(1-\beta)corr\_LM,$$

where $tdm\_lt\_corr\_RM\_SM_{pre}$ is an amplitude correlation parameter between a right channel time domain signal that is obtained after long-term smoothing and that is of the previous frame of the current frame and the reference channel signal, β is a smoothing factor, a value range of β is [0, 1], and corr_RM is the right channel amplitude correlation parameter, and it may be understood that a value of the smoothing factor α and a value of the smoothing factor β may be the same, or may be different.

Figure 4:
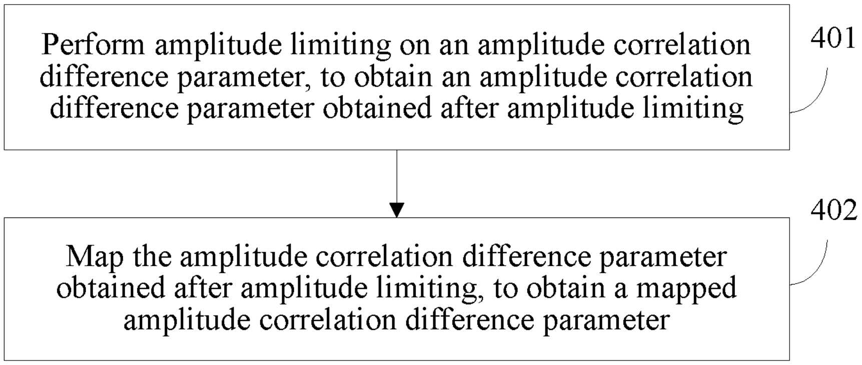
FIG. 4 is a flowchart of a mapping processing method according to an embodiment of the present disclosure.

In an implementation, the performing mapping processing on the amplitude correlation difference parameter in step 202 may be shown in FIG. 4, and may include the following steps.

401. Perform amplitude limiting on the amplitude correlation difference parameter, to obtain an amplitude correlation difference parameter obtained after amplitude limiting. In an implementation, the amplitude limiting may be segmented amplitude limiting or non-segmented amplitude limiting, and the amplitude limiting may be linear amplitude limiting or non-linear amplitude limiting.

Specific amplitude limiting may be implemented using a preset algorithm. The following two specific examples are used to describe the amplitude limiting provided in this embodiment of the present disclosure. It should be noted that the following two examples are merely instances, and constitute no limitation to this embodiment of the present disclosure, and another amplitude limiting manner may be used when the amplitude limiting is performed.

A first amplitude limiting manner. Amplitude limiting is performed on the amplitude correlation difference parameter using the following formula:

$$diff\_lt\_corr\_limit=\begin{cases}RATIO\_MAX, & \text{when } diff\_lt\_corr>RATIO\_MAX\\ diff\_lt\_corr, & \text{in other cases}\\ RATIO\_MIN, & \text{when } diff\_lt\_corr<RATIO\_MIN\end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting, RATIO_MIN is a minimum value of the amplitude correlation difference parameter obtained after amplitude limiting, and RATIO_MAX>RATIO_MIN RATIO_MAX is a preset empirical value. For example, a value range of RATIO_MAX may be [1.0, 3.0], and RATIO_MAX may be 1.0, 2.0, 3.0, or the like. RATIO_MIN is a preset empirical value. For example, a value range of RATIO_MIN may be [−3.0, −1.0], and RATIO_MIN may be −1.0, −2.0, −3.0, or the like. It should be noted that, in this embodiment of the present disclosure, a specific value of RATIO_MAX and a specific value of RATIO_MIN are not limited. As long as the specific values meet RATIO_MAX>RATIO_MIN, implementation of this embodiment of the present disclosure is not affected.

A second amplitude limiting manner. Amplitude limiting is performed on the amplitude correlation difference parameter using the following formula:

$$\text{diff\_lt\_corr\_limit} = \begin{cases} \text{RATIO\_MAX}, & \text{when diff\_lt\_corr} > \text{RATIO\_MAX} \\ \text{diff\_lt\_corr}, & \text{in other cases} \\ -\text{RATIO\_MAX}, & \text{when diff\_lt\_corr} < -\text{RATIO\_MAX} \end{cases},$$

where diff_lt_corr_limit is the amplitude correlation difference parameter obtained after amplitude limiting, diff_lt_corr is the amplitude correlation difference parameter, and RATIO_MAX is a maximum value of the amplitude correlation difference parameter obtained after amplitude limiting. RATIO_MAX is a preset empirical value. For example, a value range of RATIO_MAX may be [1.0, 3.0], and RATIO_MAX may be 1.0, 1.5, 2.0, 3.0, or the like.

Amplitude limiting is performed on the amplitude correlation difference parameter, so that the amplitude correlation difference parameter obtained after amplitude limiting is within a preset range, it can be further ensured that a sound image of a synthesized stereo audio signal obtained after encoding is stable, drift phenomena are reduced, and encoding quality is improved.

402. Map the amplitude correlation difference parameter obtained after amplitude limiting, to obtain the mapped amplitude correlation difference parameter. In an implementation, the mapping may be segmented mapping or non-segmented mapping, and the mapping may be linear mapping or non-linear mapping.

Specific mapping may be implemented using a preset algorithm. The following four specific examples are used to describe the mapping provided in this embodiment of the present disclosure. It should be noted that the following four examples are merely instances, and constitute no limitation to this embodiment of the present disclosure, and another mapping manner may be used when the mapping is performed.

A first mapping manner. The amplitude correlation difference parameter is mapped using ti e following formula:

$$\text{diff\_lt\_corr\_map} = \begin{cases} A_1 * \text{diff\_lt\_corr\_limit} + B_1, & \text{when diff\_lt\_corr\_limit} > \text{RATIO\_HIGH} \\ A_2 * \text{diff\_lt\_corr\_limit} + B_2, & \text{when diff\_lt\_corr\_limit} < \text{RATIO\_LOW} \\ A_3 * \text{diff\_lt\_corr\_limit} + B_3, & \text{when RATIO\_LOW} \le \text{diff\_lt\_corr\_limit} \le \text{RATIO\_HIGH} \end{cases},$$

where $$A_1 = \frac{\text{MAP\_MAX} - \text{MAP\_HIGH}}{\text{RATIO\_MAX} - \text{RATIO\_HIGH}},$$

$$B_1 = \text{MAP\_MAX} - \text{RATIO\_MAX} * A_1 \text{ or } B_1 = \text{MAP\_HIGH} - \text{RATIO\_HIGH} * A_1,$$

$$A_2 = \frac{\text{MAP\_LOW} - \text{MAP\_MIN}}{\text{RATIO\_LOW} - \text{RATIO\_MIN}},$$

$$B_2 = \text{MAP\_LOW} - \text{RATIO\_LOW} * A_2 \text{ or } B_2 = \text{MAP\_MIN} - \text{RATIO\_MIN} * A_2,$$

$$A_3 = \frac{\text{MAP\_HIGH} - \text{MAP\_LOW}}{\text{RATIO\_HIGH} - \text{RATIO\_LOW}},$$

$$B_3 = \text{MAP\_HIGH} - \text{RATIO\_HIGH} * A_3 \text{ or } B_3 = \text{MAP\_LOW} - \text{RATIO\_LOW} * A_3,$$

where diff_lt_corr_limit is the amplitude correlation difference parameter obtained after amplitude limiting, diff_lt_corr_map is the mapped amplitude correlation difference parameter, MAP_MAX is a maximum value of the mapped amplitude correlation difference parameter, MAP_HIGH is a high threshold of a value of the mapped amplitude correlation difference parameter, MAP_LOW is a low threshold of a value of the mapped amplitude correlation difference parameter, MAP_MIN is a minimum value of the mapped amplitude correlation difference parameter, MAP_MAX>MAP_HIGH>MAP-_LOW>MAP_MIN, ad MAP_MAX MAP_HIGH, MAP_LOW, ad MAP_MIN may all be preset empirical values. For example, a value range of MAP_MAX may be [2.0, 2.5], and a specific value may be 2.0, 2.2, 2.5, or the like. A value range of MAP_HIGH may be [1.2, 1.7], and a specific value may be 1.2, 1.5, 1.7, or the like. A value range of MAP_LOW may be [0.8, 1.3], and a specific value may be 0.8, 1.0, 1.3, or the like. A value range of MAP_MIN may be [0.0, 0.5], and a specific value may be 0.0, 0.3, 0.5, or the like.

RATIO_MAX is the maximum value of the amplitude correlation difference parameter obtained after amplitude limiting. RATIO_HIGH is a high threshold of the amplitude correlation difference parameter obtained after amplitude limiting. RATIO_LOW is a low threshold of the amplitude correlation difference parameter obtained after amplitude limiting. RATIO_MIN is the minimum value of the amplitude correlation difference parameter obtained after amplitude limiting.

RATIO_MAX>RATIO_HIGH>RATIO_LOW>RATIO_MIN RATIO_MAX, RATIO_HIGH, RATIO_LOW, ad RATIO_MIN may all be preset empirical values. For values of RATIO_MAX and RATIO_MIN, refer to the foregoing description. A value range of RATIO_HIGH may be [0.5, 1.0], and a specific value may be 0.5, 1.0, 0.75, or the like. A value range of RATIO_LOW may be [−1.0, −0.5], and a specific value may be −0.5, −1.0, −0.75, or the like.

A second mapping manner. The amplitude correlation difference parameter is mapped using the following formula:

$$\text{diff\_lt\_corr\_map} = \begin{cases} 1.08*\text{diff\_lt\_corr\_limit}+0.38, & \text{when diff\_lt\_corr\_limit} > 0.5*\text{RATIO\_MAX} \\ 0.64*\text{diff\_lt\_corr\_limit}+1.28, & \text{when diff\_lt\_corr\_limit} < -0.5*\text{RATIO\_MAX}, \\ 0.26*\text{diff\_lt\_corr\_limit}+0.995, & \text{in other cases} \end{cases}$$

where segmentation points 0.5*RATIO_MAX and −0.5*RATIO_MAX in the formula in the second mapping manner may be determined in an adaptive determining manner. An adaptive selection factor may be a delay value: delay_com, and therefore a segmentation point diff_lt_corr_limit_s may be expressed as the following function: diff_lt_corr_limit_s=f(delay_com).

A third mapping manner. Non-linear mapping is performed on the amplitude correlation difference parameter using the following formula:

$$\text{diff\_lt\_corr\_map}=a*b^{\text{diff\_lt\_corr\_limit}}+c,$$

where diff_lt_corr_map is the mapped amplitude correlation difference parameter, diff_lt_corr_limit is the amplitude correlation difference parameter obtained after amplitude limiting, a value range of a is [0, 1], for example, a value of a may be 0, 0.3, 0.5, 0.7, 1, or the like, a value range of b is [1.5, 3], for example, a value of b may be 1.5, 2, 2.5, 3, or the like, and a value range of c is [0, 0.5], for example, a value of c may be 0, 0.1, 0.3, 0.4, 0.5, or the like.

Figure 5A:
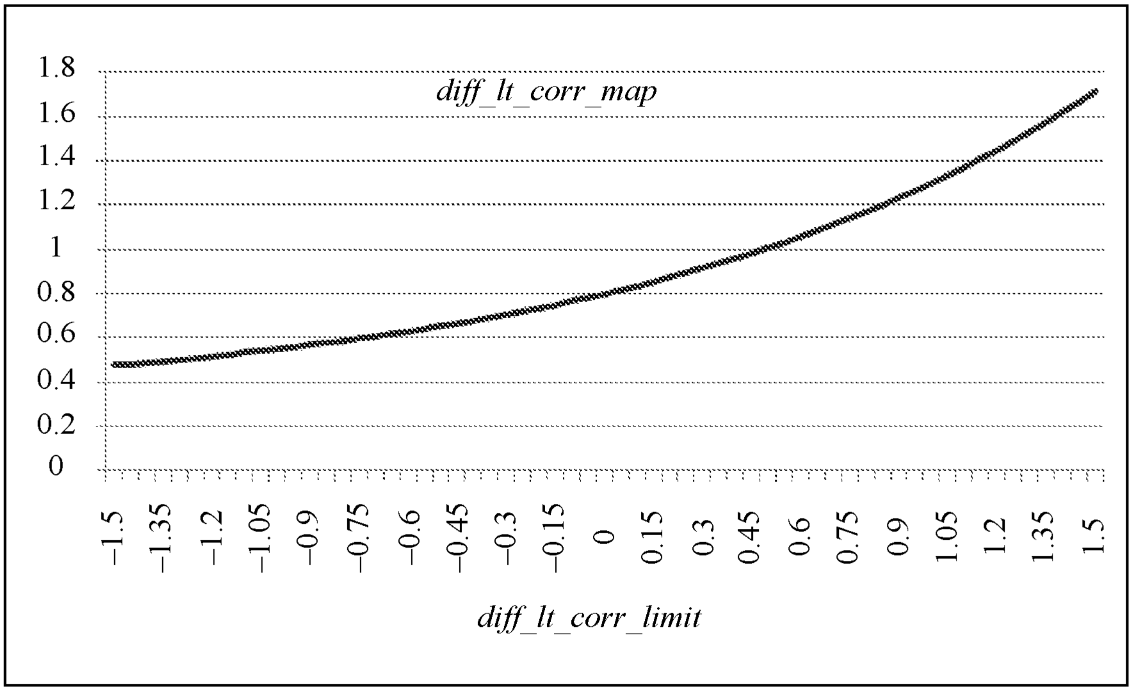
FIG. 5A is a diagram of a mapping relationship between an amplitude correlation difference parameter obtained after amplitude limiting and a mapped amplitude correlation difference parameter according to an embodiment of the present disclosure.
Figure 5B:
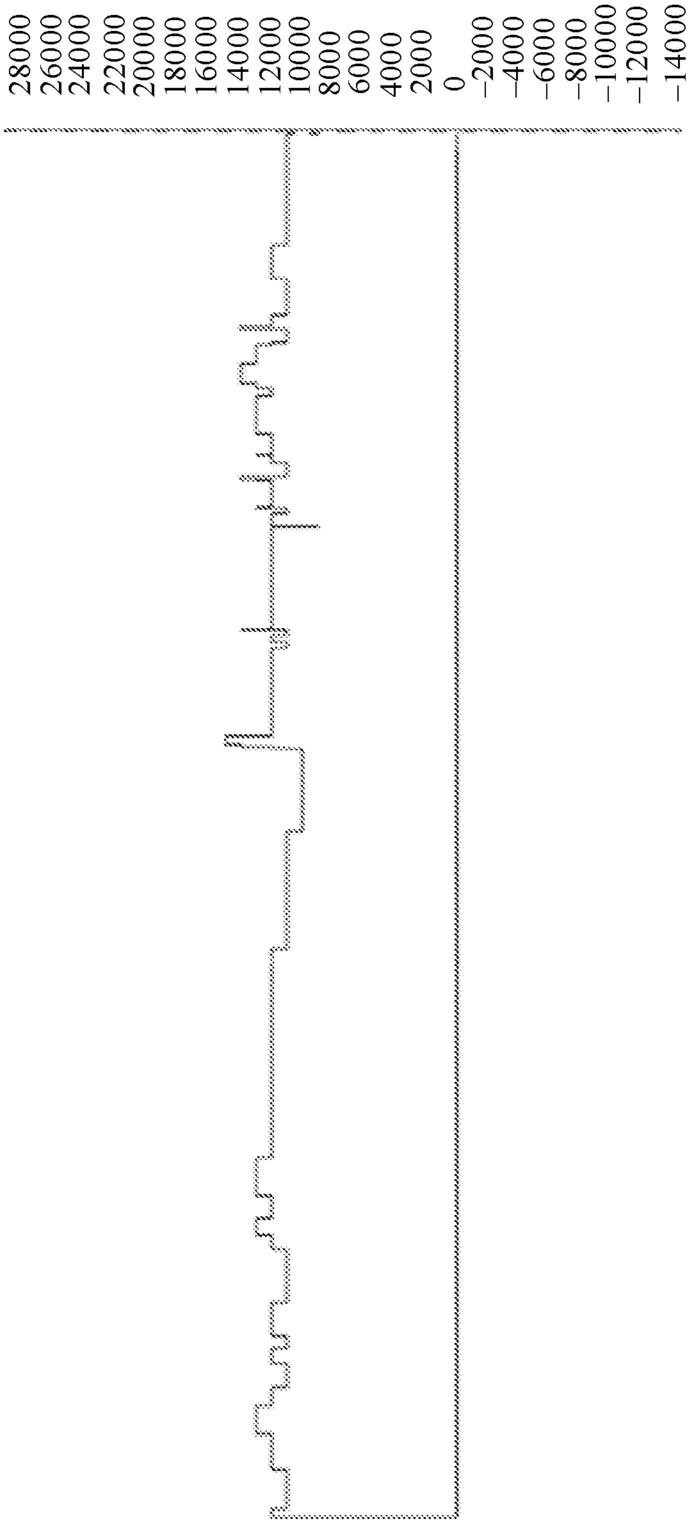
FIG. 5B is a schematic diagram of a mapped amplitude correlation difference parameter obtained after processing according to an embodiment of the present disclosure.

For example, when the value of a is 0.5, the value of b is 2.0, and the value of c is 0.3, a mapping relationship between diff_lt_corr_map ad diff_lt_corr_limit may be shown in FIG. 5A. It may be learned from FIG. 5A that a change range of diff_lt_corr_map is [0.4, 1.8]. Correspondingly, based on diff_lt_corr_mpp shown in FIG. 5A, a segment of stereo audio signal is selected for analysis, and values of diff_lt_corr_map of different frames of the segment of stereo audio signal obtained after processing is shown in FIG. 5B. Because a value of diff_lt_corr_map is relatively small, to make a difference of the values of diff_lt_corr_map of the different frames appear to be relatively obvious, diff_lt_corr_map of each frame is enlarged by 30000 times during analog output. It can be learned from FIG. 5B that a change range of diff_lt_corr_map of the different frames is [9000, 15000]. Therefore, a change range of corresponding diff_lt_corr_map is [9000/30000, 15000/30000], that is, [0.3, 0.5]. Inter-frame fluctuation of the processed stereo audio signal is smooth, so that it is ensured that a sound image of a synthesized stereo audio signal is stable.

A fourth mapping manner. The amplitude correlation difference parameter is mapped using the following formula:

$$\text{diff\_lt\_corr\_map}=a*(\text{diff\_lt\_corr\_limit}+1.5)^2+b*(\text{diff\_lt\_corr\_limit}+1.5)+c,$$

where diff_lt_corr_map is the mapped amplitude correlation difference parameter, diff_lt_corr_limit is the amplitude correlation difference parameter obtained after amplitude limiting, a value range of a is [0.08, 0.12], for example, a value of a may be 0.08, 0.1, 0.12, or the like, a value range of b is [0.03, 0.07], for example, a value of b may be 0.03, 0.05, 0.07, or the like, and a value range of c is [0.1, 0.3], for example, a value of c may be 0.1, 0.2, 0.3, or the like.

Figure 6A:
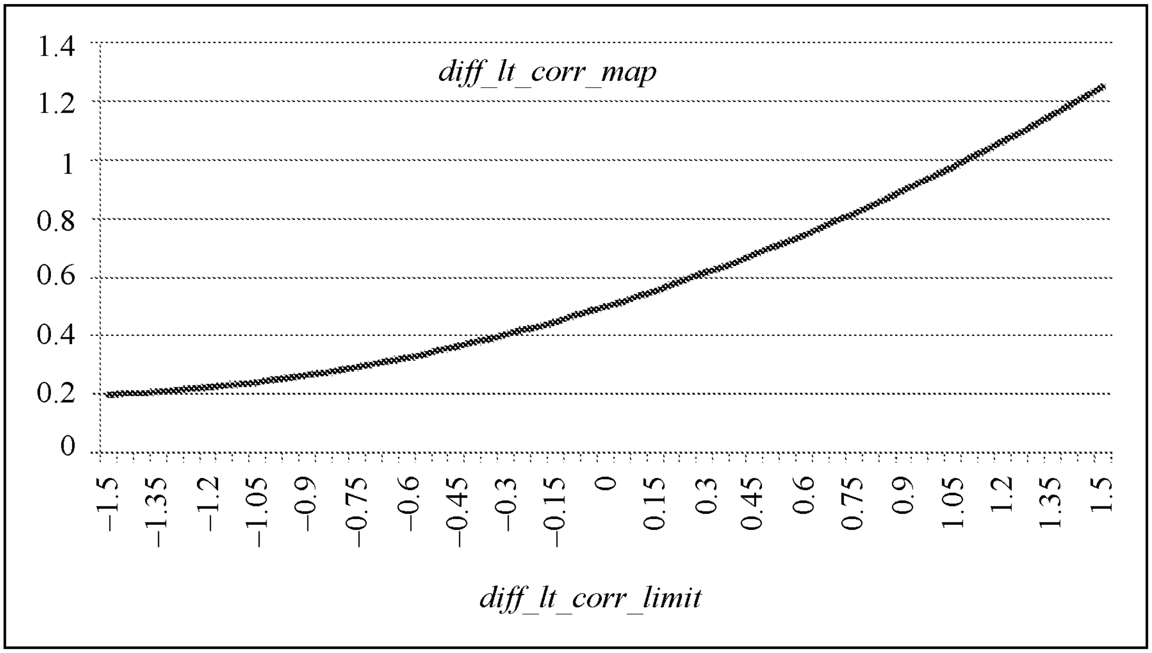
FIG. 6A is a diagram of a mapping relationship between an amplitude correlation difference parameter obtained after amplitude limiting and a mapped amplitude correlation difference parameter according to another embodiment of the present disclosure.
Figure 6B:
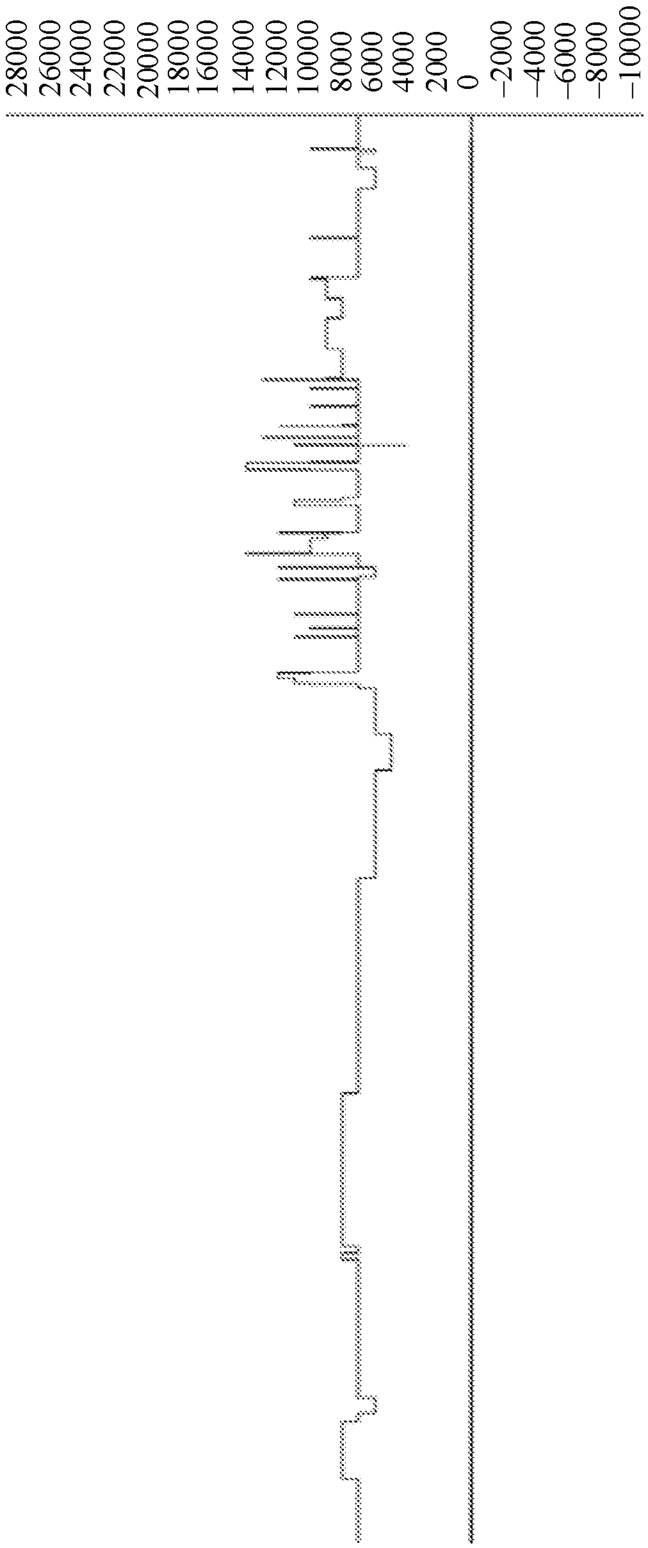
FIG. 6B is a schematic diagram of a mapped amplitude correlation difference parameter obtained after processing according to another embodiment of the present disclosure.

For example, when the value of a is 0.1, the value of b is 0.05, and the value of c is 0.2, a mapping relationship between diff_lt_corr_map and diff_lt_corr_limit may be shown in FIG. 6A. It may be learned from FIG. 6A that a change range of diff_lt_corr_map is [0.2, 1.4]. Correspondingly, based on diff_lt_corr_map shown in FIG. 6A, a segment of stereo audio signal is selected for analysis, and values of diff_lt_corr_-map of different frames of the segment of stereo audio signal obtained after processing is shown in FIG. 6B. Because a value of diff_lt_corr_map is relatively small, to make a difference of the values of diff_lt_corr_map of the different frames appear to be relatively obvious, diff_lt_corr_map of each frame is enlarged by 30000 times during analog output. It can be learned from FIG. 6B that a change range of diff_lt_corr_map of the different frames is [4000, 14000]. Therefore, a change range of corresponding diff_lt_corr_map is [4000/30000, 14000/30000], that is, [0.133, 0.46]. Therefore, inter-frame fluctuation of the processed stereo audio signal is smooth, so that it is ensured that a sound image of a synthesized stereo audio signal is stable.

The amplitude correlation difference parameter obtained after amplitude limiting is mapped, so that the mapped amplitude correlation difference parameter is within a preset range, it can be further ensured that a sound image of a synthesized stereo audio signal obtained after encoding is stable, drift phenomena are reduced, and encoding quality is improved. In addition, when segmented mapping is used, a segmentation point for segmented mapping may be adaptively determined based on a delay value, so that the mapped amplitude correlation difference parameter is more consistent with a characteristic of the current frame, it is further ensured that the sound image of the synthesized stereo audio signal obtained after encoding is stable, drift phenomena are reduced, and encoding quality is improved.

Figure 7A:
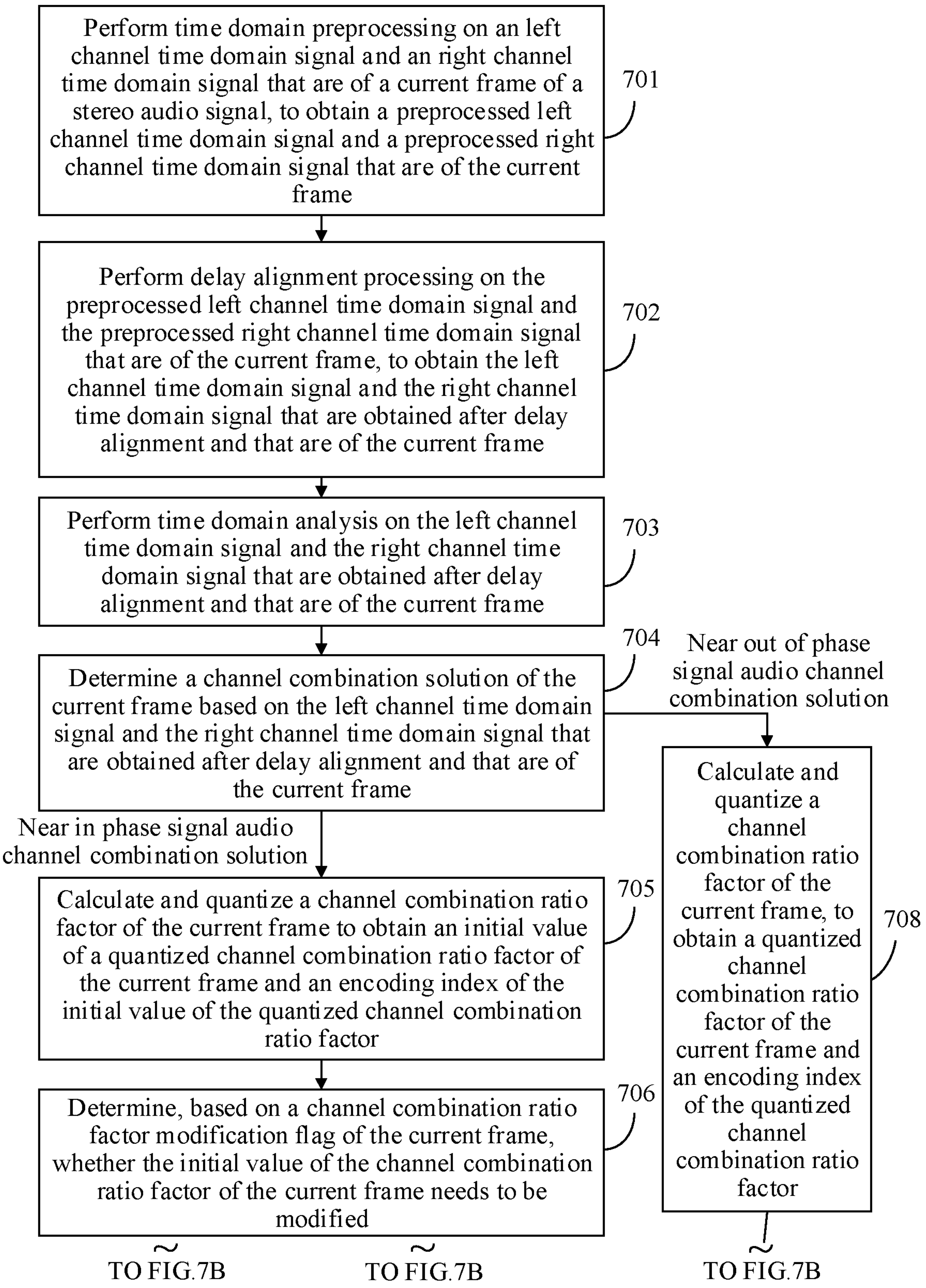
FIG. 7A and FIG. 7B are a flowchart of a stereo encoding method according to another embodiment of the present disclosure.
Figure 7B:
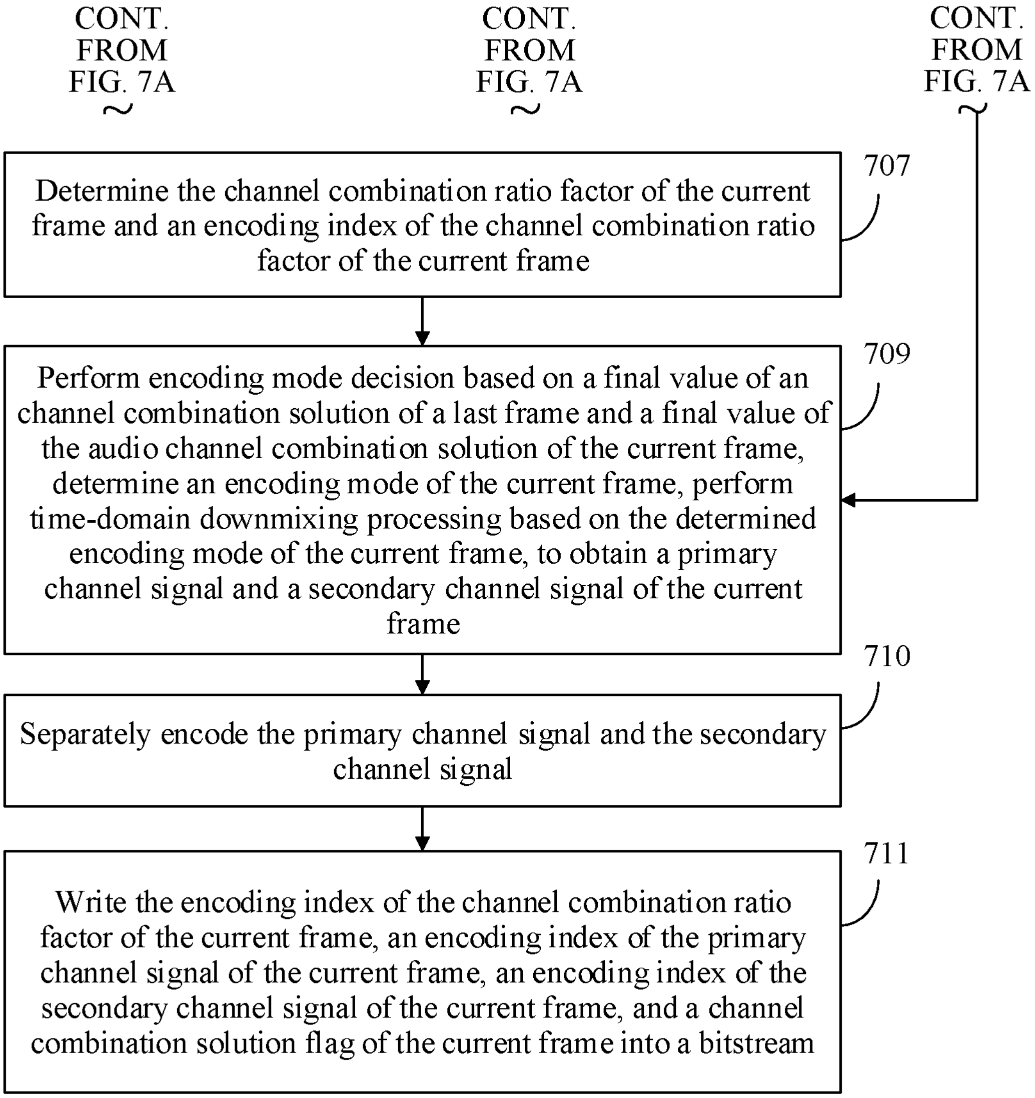

FIG. 7A and FIG. 7B depict a procedure of a method for encoding a stereo signal according to an embodiment of the present disclosure. The procedure includes the following steps.

701. Perform time domain preprocessing on a left channel time domain signal and a right channel time domain signal that are of a current frame of a stereo audio signal, to obtain a preprocessed left channel time domain signal and a preprocessed right channel time domain signal that are of the current frame.

The performing time domain preprocessing on the left channel time domain signal and the right channel time domain signal of the current frame may include performing high-pass filtering processing on the left channel time domain signal and the right channel time domain signal of the current frame, to obtain the preprocessed left channel time domain signal and the preprocessed right channel time domain signal of the current frame. The preprocessed left channel time domain signal of the current frame is denoted as $x_{L\_HP}(n)$, and the preprocessed right channel time domain signal of the current frame is denoted as $x_{R\_HP}(n)$.

In an implementation, a filter performing the high-pass filtering processing may be an infinite impulse response (IIR) filter whose cut-off frequency is 20 Hertz (Hz). Certainly, the processing may be performed using another type of filter. A type of a specific filter used is not limited in this embodiment of the present disclosure. For example, in an implementation, a transfer function of a high-pass filter with a cut-off frequency of 20 Hz corresponding to a sampling rate of 16 KHz is:

$$H_{20Hz}(z) = \frac{b_0 + b_1 z^{-1} + b_2 z^{-2}}{1 + a_1 z^{-1} + a_2 z^{-2}},$$

where $b_0$=0.994461788958195, $b_1$=−1.988923577916390, $b_2$=0.994461788958195, $a_1$=1.988892905899653, $a_2$=−0.988954249933127, z is a transform factor of Z-transform, and correspondingly, $$x_{L\_HP}(n)=b_0*x_L(n)+b_1*x_L(n-1)+b_2*x_L(n-2)-a_1*x_{L\_HP}(n-1)-a_2*x_{L\_HP}(n-2)$$

$$x_{R\_HP}(n)=b_0*x_R(n)+b_1*x_R(n-1)+b_2*x_R(n-2)-a_1*x_{R\_HP}(n-1)-a_2*x_{R\_HP}(n-2).$$

702. Perform delay alignment processing on the preprocessed left channel time domain signal and the preprocessed right channel time domain signal that are of the current frame, to obtain the left channel time domain signal and the right channel time domain signal that are obtained after delay alignment and that are of the current frame.

For specific implementation, refer to the implementation of step 102, and details are not described again.

703. Perform time domain analysis on the left channel time domain signal and the right channel time domain signal that are obtained after delay alignment and that are of the current frame.

In an implementation, time domain analysis may include transient detection. The transient detection may be performing energy detection on the left channel time domain signal and the right channel time domain signal that are obtained after delay alignment and that are of the current frame, to detect whether a sudden change of energy occurs in the current frame. For example, energy $E_{cur\_L}$ of the left channel time domain signal that is obtained after delay alignment and that is of the current frame may be calculated, and transient detection is performed based on an absolute value of a difference between energy $E_{pre\_L}$ of a left channel time domain signal that is obtained after delay alignment and that is of a previous frame and the energy $E_{cur\_L}$ of the left channel time domain signal that is obtained after delay alignment and that is of the current frame, so as to obtain a transient detection result of the left channel time domain signal that is obtained after delay alignment and that is of the current frame.

A method for performing transient detection on the right channel time domain signal that is obtained after delay alignment and that is of the current frame may be the same as that for performing transient detection on the left channel time domain signal. Details are not described again.

It should be noted that, because a result of the time domain analysis is used for subsequent primary channel signal encoding and secondary channel signal encoding, as long as the time domain analysis is performed before the primary channel signal encoding and the secondary channel signal encoding, implementation of the present disclosure is not affected. It may be understood that the time domain analysis may further include other time domain analysis, such as band expansion preprocessing, in addition to transient detection.

704. Determine a channel combination solution of the current frame based on the left channel time domain signal and the right channel time domain signal that are obtained after delay alignment and that are of the current frame.

In an implementation, determining the channel combination solution of the current frame includes a channel combination solution initial decision and a channel combination solution modification decision. In another implementation, determining the channel combination solution of the current frame may include a channel combination solution initial decision but does not include a channel combination solution modification decision.

A channel combination initial decision in an implementation of the present disclosure is first described.

The channel combination initial decision may include performing a channel combination solution initial decision based on the left channel time domain signal and the right channel time domain signal that are obtained after delay alignment and that are of the current frame, where the channel combination solution initial decision includes determining a signal type of in-phase/out-of-phase flag and an initial value of the channel combination solution. Details are as follows.

A1. Determine a value of the signal type of in-phase/out-of-phase flag of the current frame.

When the value of the signal type of in-phase/out-of-phase flag of the current frame is being determined, a correlation value xorr of two time-domain signals of the current frame may be calculated based on $x'_L(n)$ and $x'_R(n)$, and then the signal type of in-phase/out-of-phase flag of the current frame is determined based on xorr. For example, in an implementation, when xorr is less than or equal to a threshold of near in-phase/out-of-phase type, the signal type of in-phase/out-of-phase flag is set to “1”, or when xorr is greater than the threshold of near in-phase/out-of-phase type, the signal type of in-phase/out-of-phase flag is set to 0. A value of the threshold of near in-phase/out-of-phase type is preset, for example, may be set to 0.85, 0.92, 2, 2.5, or the like. It should be noted that a specific value of the threshold of near in-phase/out-of-phase type may be set based on experience, and a specific value of the threshold is not limited in this embodiment of the present disclosure.

It may be understood that, in some implementations, xorr may be a factor for determining a value of a signal type of in-phase/out-of-phase flag of the current frame. In other words, when the value of the signal type of in-phase/out-of-phase flag of the current frame is being determined, reference may be made not only to xorr, but also to another factor. For example, the another factor may be one or more of the following parameters, a difference signal between the left channel time domain signal that is obtained after delay alignment and that is of the current frame and the right channel time domain signal that is obtained after delay alignment and that is of the current frame, a signal energy ratio of the current frame, a difference signal between left channel time domain signals that are obtained after delay alignment and that are of previous N frames of the current frame and the right channel time domain signal that is obtained after delay alignment and that is of the current frame, and a signal energy ratio of the previous N frames of the current frame. N is an integer greater than or equal to 1. The previous N frames of the current frame are N frames that are continuous with the current frame in time domain.

The obtained signal type of in-phase/out-of-phase flag of the current frame is denoted as tmp_SM_flag. When tmp_SM_flag is 1, it indicates that the left channel time domain signal that is obtained after delay alignment and that is of the current frame and the right channel time domain signal that is obtained after delay alignment and that is of the current frame are near out-of-phase signals. When tmp_SM_flag is 0, it indicates that the left channel time domain signal that is obtained after delay alignment and that is of the current frame and the right channel time domain signal that is obtained after delay alignment and that is of the current frame are near in-phase signals.

A2. Determine an initial value of a channel combination solution flag of the current frame.

If the value of the signal type of in-phase/out-of-phase flag of the current frame is the same as a value of a channel combination solution flag of a previous frame, the value of the channel combination solution flag of the previous frame is used as the initial value of the channel combination solution flag of the current frame.

If the value of the signal type of in-phase/out-of-phase flag of the current frame is different from the value of the channel combination solution flag of the previous frame, a signal-to-noise ratio of the left channel time domain signal that is obtained after delay alignment and that is of the current frame and a signal-to-noise ratio of the right channel time domain signal that is obtained after delay alignment and that is of the current frame are separately compared with a signal-to-noise ratio threshold. If both the signal-to-noise ratio of the left channel time domain signal that is obtained after delay alignment and that is of the current frame and the signal-to-noise ratio of the right channel time domain signal that is obtained after delay alignment and that is of the current frame are less than the signal-to-noise ratio threshold, the value of the signal type of in-phase/out-of-phase flag of the current frame is used as the initial value of the channel combination solution flag of the current frame, otherwise, the value of the channel combination solution flag of the previous frame is used as the initial value of the channel combination solution flag of the current frame. In an implementation, a value of the signal-to-noise ratio threshold may be 14.0, 15.0, 16.0, or the like.

The obtained initial value of the channel combination solution flag of the current frame is denoted as tdm_SM_flag_loc.

A channel combination modification decision in an implementation of the present disclosure is then described.

The channel combination modification decision may include performing a channel combination solution modification decision based on the initial value of the channel combination solution flag of the current frame, and determining the channel combination solution flag of the current frame and a channel combination ratio factor modification flag. The obtained channel combination solution flag of the current frame may be denoted as tdm_SM_flag, and the obtained channel combination ratio factor modification flag is denoted as tdm_SM_mod i_flag. Details are as follows.

B1. If a channel combination ratio factor modification flag of the previous frame of the current frame is 1, determine that the channel combination solution of the current frame is a near out-of-phase signal channel combination solution.

B2. If the channel combination ratio factor modification flag of the previous frame of the current frame is 0, perform the following processing.

B21. Determine whether the current frame meets a channel combination solution switching condition, which includes the following steps.

B211. If a signal type of a primary channel signal of the previous frame of the current frame is a voice signal, it may be determined, based on a signal frame type of the previous frame of the current frame, a signal frame type of a previous frame of the previous frame of the current frame, a raw coding mode of the previous frame of the current frame, and a quantity of consecutive frames, starting from a previous frame of the current frame and ending at the current frame, that have the channel combination solution of the current frame, whether the current frame meets the channel combination solution switching condition, where at least one of the following two types of determining may be performed.

First type of determining.

Determine whether the following conditions 1a, 1b, 2, and 3 are met.

Condition 1a: A frame type of a primary channel signal of the previous frame of the previous frame of the current frame is VOICED_CLAS, ONSET, SIN_ONSET, INACTIVE_CLAS, or AUDIO_CLAS, and a frame type of the primary channel signal of the previous frame of the current frame is UNVOICED_CLAS or VOICED_TRANSITION.

Condition 1b: A frame type of a secondary channel signal of the previous frame of the previous frame of the current frame is VOICED_CLAS, ONSET, SIN_ONSET, INACTIVE_CLAS, or AUDIO_CLAS, and a frame type of a secondary channel signal of the previous frame of the current frame is UNVOICED_CLAS or VOICED_TRANSITION.

Condition 2: Neither a raw coding mode of the primary channel signal of the previous frame of the current frame nor a raw coding mode of the secondary channel signal of the previous frame of the current frame is VOICED.

Condition 3: The channel combination solution of the current frame is the same as a channel combination solution of the previous frame of the current frame, and a quantity of consecutive frames, ending at the current frame, that have the channel combination solution of the current frame is greater than a consecutive frame threshold. In an implementation, the consecutive frame threshold may be 3, 4, 5, 6, or the like.

If at least one of the condition 1a or the condition 1b is met, and both the condition 2 and the condition 3 are met, it is determined that the current frame meets the channel combination solution switching condition.

Second type of determining.

Determine whether the following conditions 4 to 7 are met.

Condition 4: The frame type of the primary channel signal of the previous frame of the current frame is UNVOICED_CLAS, or the frame type of the secondary channel signal of the previous frame of the current frame is UNVOICED_CLAS.

Condition 5: Neither the raw coding mode of the primary channel signal of the previous frame of the current frame nor the raw coding mode of the secondary channel signal of the previous frame of the current frame is VOICED.

Condition 6: A long-term root mean square energy value of the left channel time domain signal that is obtained after delay alignment and that is of the current frame is less than an energy threshold, and a long-term root mean square energy value of the right channel time domain signal that is obtained after delay alignment and that is of the current frame is less than the energy threshold. In an implementation, the energy threshold may be 300, 400, 450, 500, or the like.

Condition 7: A quantity of frames in which the channel combination solution of the previous frame of the current frame is continuously used until the current frame is greater than the consecutive frame threshold.

If the condition 4, the condition 5, the condition 6, and the condition 7 are all met, it is determined that the current frame meets the channel combination solution switching condition.

B212. If a frame type of a primary channel signal of the previous frame of the current frame is a music signal, determine, based on an energy ratio of a low frequency band signal to a high frequency band signal of the primary channel signal of the previous frame of the current frame, and an energy ratio of a low frequency band signal to a high frequency band signal of a secondary channel signal of the previous frame of the current frame, whether the current frame meets the switching condition, which includes determining whether the following condition 8 is met.

Condition 8: The energy ratio of the low frequency band signal to the high frequency band signal of the primary channel signal of the previous frame of the current frame is greater than an energy ratio threshold, and the energy ratio of the low frequency band signal to the high frequency band signal of the secondary channel signal of the previous frame of the current frame is greater than the energy ratio threshold. In an implementation, the energy ratio threshold may be 4000, 4500, 5000, 5500, 6000, or the like.

If the condition 8 is met, it is determined that the current frame meets the channel combination solution switching condition.

B22. If an initial value of the channel combination solution of the previous frame of the current frame is different from an initial value of the channel combination solution of the current frame, set a flag bit to 1, if the current frame meets the channel combination solution switching condition, use the initial value of the channel combination solution of the current frame as the channel combination solution of the current frame, and set a flag bit to 0, where that the flag bit is 1 indicates that the initial value of the channel combination solution of the current frame is different from the initial value of the channel combination solution of the previous frame of the current frame, and that the flag bit is 0 indicates that the initial value of the channel combination solution of the current frame is the same as the initial value of the channel combination solution of the previous frame of the current frame.

B23. If the flag bit is 1, the current frame meets the channel combination solution switching condition, and the channel combination solution of the previous frame of the current frame is different from the signal type of in-phase/out-of-phase flag of the current frame, set the channel combination solution flag of the current frame to be different from the channel combination solution flag of the previous frame of the current frame.

B24. If the channel combination solution of the current frame is the near out-of-phase signal channel combination solution, the channel combination solution of the previous frame of the current frame is a near in-phase signal channel combination solution, and the channel combination ratio factor of the current frame is less than a channel combination ratio factor threshold, modify the channel combination solution of the current frame to the near in-phase signal channel combination solution, and set the channel combination ratio factor modification flag of the current frame to 1.

When the channel combination solution of the current frame is the near in-phase signal channel combination solution, 705 is performed, or when the channel combination solution of the current frame is the near out-of-phase signal channel combination solution, 708 is performed.

705. Calculate and quantize a channel combination ratio factor of the current frame based on the left channel time domain signal and the right channel time domain signal that are obtained after delay alignment and that are of the current frame, and a channel combination solution flag of the current frame, to obtain an initial value of the quantized channel combination ratio factor of the current frame and an encoding index of the initial value of the quantized channel combination ratio factor.

In an implementation, the initial value of the channel combination ratio factor of the current frame and the encoding index of the initial value of the channel combination ratio factor may be obtained in the following manner.

C1. Calculate frame energy of the left channel time domain signal that is obtained after delay alignment and that is of the current frame and frame energy of the right channel time domain signal that is obtained after delay alignment and that is of the current frame based on the left channel time domain signal and the right channel time domain signal that are obtained after delay alignment and that are of the current frame.

The frame energy rms_L of the left channel time domain signal that is obtained after delay alignment and that is of the current frame may be obtained through calculation using the following formula:

$$\text{rms\_L} = \frac{1}{N}\sum_{n=0}^{N-1} x'_L(n) * x'_L(n).$$

The frame energy rms_R of the right channel time domain signal that is obtained after delay alignment and that is of the current frame may be obtained through calculation using the following formula:

$$\text{rms\_R} = \frac{1}{N}\sum_{n=0}^{N-1} x'_R(n) * x'_R(n).$$

$x'_L(n)$ is the left channel time domain signal that is obtained after delay alignment and that is of the current frame, and $x'_R(n)$ is the right channel time domain signal that is obtained after delay alignment and that is of the current frame.

C2. Calculate the initial value of the channel combination ratio factor of the current frame based on the frame energy of the left channel time domain signal and the right channel time domain signal that are obtained after delay alignment and that are of the current frame.

In an implementation, the initial value ratio_init of the channel combination ratio factor corresponding to the near in-phase signal channel combination solution of the current frame may be obtained through calculation using the following formula:

$$\text{ratio\_init} = \frac{\text{rms\_R}}{\text{rms\_L} + \text{rms\_R}}.$$

C3. Quantize the initial value of the channel combination ratio factor of the current frame that is obtained through calculation, to obtain the quantized initial value ratio_init, of the channel combination ratio factor of the current frame and the encoding index ratio_idx_init corresponding to the quantized initial value of the channel combination ratio factor.

In an implementation, ratio_idx_init a $ratio\_init_{qua}$ meet the following relationship:

$ratio\_init_{qua}$=ratio_tabl[ratio_idx_init], where ratio_tabl is a codebook for scalar quantization.

In an embodiment, when quantization and encoding are performed on the channel combination ratio factor of the current frame, any scalar quantization method may be used, for example, a uniform scalar quantization method or a non-uniform scalar quantization method. In a specific implementation, a quantity of bits for encoding during quantization and encoding may be 5 bits.

In an implementation, after the initial value of the channel combination ratio factor of the current frame and the encoding index corresponding to the initial value of the channel combination ratio factor are obtained, whether to modify the encoding index corresponding to the initial value of the channel combination ratio factor of the current frame may be further determined based on a value of the channel combination solution flag tdm_SM_flag of the current frame. For example, it is assumed that the quantity of bits for encoding during quantization and encoding is 5 bits. When tdm_SM_flag=1, the encoding index ratio_idx_init corresponding to the initial value of the channel combination ratio factor of the current frame may be modified to a preset value, where the preset value may be 15, 14, 13, or the like. Correspondingly, a value of the channel combination ratio factor of the current frame is modified to $ratio\_init_{qua}$=ratio_tabl[15] $ratio\_init_{qua}$=ratio_tabl[14], $ratio\_init_{qua}$=ratio_tabl[13], or the like. When tdm_SM_flag=0, the encoding index corresponding to the initial value of the channel combination ratio factor of the current frame may not be modified.

It should be noted that, in some implementations of the present disclosure, the channel combination ratio factor of the current frame may alternatively be obtained in another manner. For example, the channel combination ratio factor of the current frame may be calculated according to any method for calculating a channel combination ratio factor in time domain stereo encoding methods. In some implementations, the initial value of the channel combination ratio factor of the current frame may alternatively be directly set to a fixed value, for example, 0.5, 0.4, 0.45, 0.55, or 0.6.

706. Determine, based on a channel combination ratio factor modification flag of the current frame, whether the initial value of the channel combination ratio factor of the current frame needs to be modified, and if it is determined that the initial value needs to be modified, modify the initial value of the channel combination ratio factor of the current frame and/or the encoding index of the initial value of the channel combination ratio factor, so as to obtain a modification value of the channel combination ratio factor of the current frame and an encoding index of the modification value of the channel combination ratio factor, or if it is determined that the initial value does not need to be modified, skip modifying the initial value of the channel combination ratio factor of the current frame and the encoding index of the initial value of the channel combination ratio factor.

In an embodiment, if the channel combination ratio factor modification flag tdm_SM_mod i_flag=1, the initial value of the channel combination ratio factor of the current frame needs to be modified. If the channel combination ratio factor modification flag tdm_SM_modi_flag=0, the initial value of the channel combination ratio factor of the current frame does not need to be modified. It may be understood that, in some implementations, the initial value of the channel combination ratio factor of the current frame is modified when tdm_SM_modi_flag=0, and the initial value of the channel combination ratio factor of the current frame is not modified when tdm_SM_mod i_flag=1. A specific method may vary according to a value assignment rule of tdm_SM_modi_flag.

In an implementation, the initial value of the channel combination ratio factor of the current frame and the encoding index of the initial value of the channel combination ratio factor may be modified in the following manner.

D1. Obtain, according to the following formula, an encoding index corresponding to the modification value of the channel combination ratio factor corresponding to the near in-phase signal channel combination solution of the current frame:

ratio_idx_mod=0.5*(tdm_last_ratio_idx+16), where tdm_last_ratio_idx is an encoding index of a channel combination ratio factor of the previous frame of the current frame, and a channel combination manner of the previous frame of the current frame is also the near in-phase signal channel combination solution.

D2. Obtain the modification value $ratio\_mod_{qua}$ of the channel combination ratio factor of the current frame according to the following formula:

$$ratio\_mod_{qua}=ratio\_tabl[ratio\_idx\_mod]$$

707. Determine the channel combination ratio factor of the current frame and an encoding index of the channel combination ratio factor of the current frame based on the initial value of the channel combination ratio factor of the current frame, the encoding index of the initial value of the channel combination ratio factor of the current frame, the modification value of the channel combination ratio factor of the current frame, the encoding index of the modification value of the channel combination ratio factor of the current frame, and the channel combination ratio factor modification flag. Only when the initial value of the channel combination ratio factor of the current frame is modified, it is necessary to determine the channel combination ratio factor of the current frame based on the modification value of the channel combination ratio factor of the current frame and the encoding index of the modification value of the channel combination ratio factor of the current frame, otherwise, the channel combination ratio factor of the current frame may be directly determined based on the initial value of the channel combination ratio factor of the current frame and the encoding index of the initial value of the channel combination ratio factor of the current frame. Then, step 709 is performed.

In an implementation, the channel combination ratio factor corresponding to the near in-phase signal channel combination solution and the encoding index of the channel combination ratio factor may be determined in the following manner.

E1. Determine the channel combination ratio factor ratio of the current frame according to the following formula:

$$ratio = \begin{cases} ratio\_init_{qua}, & \text{if } tdm\_SM\_modi\_flag = 0 \\ ratio\_mod_{qua}, & \text{if } tdm\_SM\_modi\_flag = 1 \end{cases},$$

where $ratio\_init_{qua}$ is the initial value of the channel combination ratio factor of the current frame, $ratio\_mod_{qua}$ is the modification value of the channel combination ratio factor of the current frame, and tdm_SM_modi_flag is the channel combination ratio factor modification flag of the current frame.

E2. Determine the encoding index ratio_idx corresponding to the channel combination ratio factor of the current frame according to the following formula:

$$\text{ratio\_idx} = \begin{cases} \text{ratio\_idx\_init}, & \text{if tdm\_SM\_modi\_flag} = 0 \\ \text{ratio\_idx\_mod}, & \text{if tdm\_SM\_modi\_flag} = 1 \end{cases},$$

ratio_idx_init is the encoding index corresponding to the initial value of the channel combination ratio factor of the current frame, ratio_idx_mod is the encoding index corresponding to the modification value of the channel combination ratio factor of the current frame, and tdm_SM_mod i_flag is the channel combination ratio factor modification flag of the current frame.

It may be understood that, because the channel combination ratio factor and the encoding index of the channel combination ratio factor may be determined based on each other using a codebook, any one of the foregoing steps E1 and E2 may be performed, and then the channel combination ratio factor or the encoding index of the channel combination ratio factor is determined based on the codebook.

708. Calculate and quantize a channel combination ratio factor of the current frame, to obtain a quantized channel combination ratio factor of the current frame and an encoding index of the quantized channel combination ratio factor.

In an implementation, the channel combination ratio factor corresponding to the near out-of-phase signal channel combination solution of the current frame and the encoding index corresponding to the channel combination ratio factor corresponding to the near out-of-phase signal channel combination solution of the current frame may be obtained in the following manner.

F1. Determine whether a history buffer that needs to be used to calculate the channel combination ratio factor corresponding to the near out-of-phase signal channel combination solution of the current frame needs to be reset.

In an embodiment, if the channel combination solution of the current frame is the near out-of-phase signal channel combination solution, and a channel combination solution of the previous frame of the current frame is the near in-phase signal channel combination solution, it is determined that the history buffer needs to be reset.

For example, in an implementation, if the channel combination solution flag tdm_SM_flag of the current frame is equal to 1, and the channel combination solution flag tdm_last_SM__flag of the previous frame of the current frame is equal to 0, the history buffer needs to be reset.

In another implementation, whether the history buffer needs to be reset may be determined using a history buffer reset flag tdm_SM_reset_flag. A value of the history buffer reset flag tdm_SM_reset_fag may be determined in the process of the channel combination solution initial decision and the channel combination solution modification decision. In an embodiment, the value of tdm_SM_reset_flag may be set to 1 if the channel combination solution flag of the current frame corresponds to the near out-of-phase signal channel combination solution, and the channel combination solution flag of the previous frame of the current frame corresponds to the near in-phase signal channel combination solution. Certainly, the value of tdm_SM_reset_flag may alternatively be set to 0 to indicate that the channel combination solution flag of the current frame corresponds to the near out-of-phase signal channel combination solution, and the channel combination solution flag of the previous frame of the current frame corresponds to the near in-phase signal channel combination solution.

When the history buffer is being reset, all parameters in the history buffer may be reset according to a preset initial value. Alternatively, some parameters in the history buffer may be reset according to a preset initial value, and other parameters may be reset according to a corresponding parameter value in a history buffer used for calculating a channel combination ratio factor corresponding to the near in-phase signal channel combination solution.

In an implementation, the parameters in the history buffer may include at least one of the following long-term smooth frame energy of a left channel time domain signal that is obtained after long-term smoothing and that is of the previous frame of the current frame, long-term smooth frame energy of a right channel time domain signal that is obtained after long-term smoothing and that is of the previous frame of the current frame, an amplitude correlation parameter between the left channel time domain signal that is obtained after delay alignment and that is of the previous frame of the current frame and a reference channel signal, an amplitude correlation parameter between the right channel time domain signal that is obtained after delay alignment and that is of the previous frame of the current frame and the reference channel signal, an amplitude correlation difference parameter between the left channel time domain signal and the right channel time domain signal that are obtained after long-term smoothing and that are of the previous frame of the current frame, an inter-frame energy difference of the left channel time domain signal that is obtained after delay alignment and that is of the previous frame of the current frame, an inter-frame energy difference of the right channel time domain signal that is obtained after delay alignment and that is of the previous frame of the current frame, a channel combination ratio factor of the previous frame of the current frame, an encoding index of the channel combination ratio factor of the previous frame of the current frame, an SM mode parameter, or the like. Parameters that are selected from these parameters as parameters in the history buffer may be selected and adjusted based on a specific requirement. Correspondingly, parameters in the history buffer that are selected for resetting according to a preset initial value may also be selected and adjusted based on a specific requirement. In an implementation, a parameter that is reset according to a corresponding parameter value in a history buffer used to calculate a channel combination ratio factor corresponding to the near in-phase signal channel combination solution may be an SM mode parameter, and the SM mode parameter may be reset according to a value of a corresponding parameter in a YX mode.

F2. Calculate and quantize the channel combination ratio factor of the current frame.

In an implementation, the channel combination ratio factor of the current frame may be calculated in the following manner.

F21. Perform signal energy analysis on the left channel time domain signal and the right channel time domain signal that are obtained after delay alignment and that are of the current frame, to obtain frame energy of the left channel time domain signal that is obtained after delay alignment and that is of the current frame, frame energy of the right channel time domain signal that is obtained after delay alignment and that is of the current frame, long-term smooth frame energy of a left channel time domain signal that is obtained after long-term smoothing and that is of the current frame, long-term smooth frame energy of a right channel time domain signal that is obtained after long-term smoothing and that is of the current frame, an inter-frame energy difference of the left channel time domain signal that is obtained after delay alignment and that is of the current frame, and an inter-frame energy difference of the right channel time domain signal that is obtained after delay alignment and that is of the current frame.

For obtaining of the frame energy of the left channel time domain signal that is obtained after delay alignment and that is of the current frame and the frame energy of the right channel time domain signal that is obtained after delay alignment and that is of the current frame, refer to the foregoing description. Details are not described herein again.

In an implementation, the long-term smooth frame energy $tdm\_lt\_rms\_L\_SM_{cur}$ of the left channel time domain signal that is obtained after delay alignment and that is of the current frame may be obtained using the following formula:

$$tdm\_lt\_rms\_L\_SM_{cur}=(1-A)*tdm\_lt\_rms\_L\_SM_{pre}+A*rms\_L,$$

where $tdm\_lt\_rms\_L\_SM_{pre}$ is the long-term smooth frame energy of the left channel of the previous frame, and A is an update factor, and usually may be a real number between 0 and 1, for example, may be 0, 0.3, 0.4, 0.5, or 1.

In an implementation, the long-term smooth frame energy $tdm\_lt\_rms\_R\_SM_{cur}$ of the right channel time domain signal that is obtained after delay alignment and that is of the current frame may be obtained using the following formula:

$$tdm\_lt\_rms\_R\_SM_{cur}=(1-B)*tdm\_lt\_rms\_R\_SM_{pre}+B*rms\_R,$$

where $tdm\_lt\_rms\_R\_SM_{pre}$ is the long-term smooth frame energy of the right channel of the previous frame, B is an update factor, and usually may be a real number between 0 and 1, for example, may be 0.3, 0.4, or 0.5, and a value of the update factor B may be the same as a value of the update factor A, or a value of the update factor B may be different from a value of the update factor A.

In an implementation, the inter-frame energy difference ener_L_dt of the left channel time domain signal that is obtained after delay alignment and that is of the current frame may be obtained using the following formula:

$$ener\_L\_dt=tdm\_lt\_rms\_L\_SM_{cur}-tdm\_lt\_rms\_L\_SM_{pre}$$

In an implementation, the inter-frame energy difference ener_R_dt of the right channel time domain signal that is obtained after delay alignment and that is of the current frame may be obtained using the following formula:

$$ener\_R\_dt=tdm\_lt\_rms\_R\_SM_{cur}-tdm\_lt\_rms\_R\_SM_{pre}$$

F22. Determine a reference channel signal of the current frame based on the left channel time domain signal and the right channel time domain signal that are obtained after delay alignment and that are of the current frame.

In an implementation, the reference channel signal mono_i(n) of the current frame may be obtained using the following formula:

$$mono\_i(n)=\frac{x'_L(i)-x'_R(i)}{2},$$

where the reference channel signal may also be referred to as a mono signal.

F23. Calculate an amplitude correlation parameter between the left channel time domain signal that is obtained after delay alignment and that is of the current frame and the reference channel signal, and calculate an amplitude correlation parameter between the right channel time domain signal that is obtained after delay alignment and that is of the current frame and the reference channel signal.

In an implementation, the amplitude correlation parameter corr_LM between the left channel time domain signal that is obtained after delay alignment and that is of the current frame and the reference channel signal may be obtained using the following formula:

$$corr\_LM=\frac{\sum_{n=0}^{N-1}|x'_L(i)|*|mono\_i(n)|}{\sum_{n=0}^{N-1}|mono\_i(n)|*|mono\_i(n)|}.$$

In an implementation, the amplitude correlation parameter corr_RM between the right channel time domain signal that is obtained after delay alignment and that is of the current frame and the reference channel signal may be obtained using the following formula:

$$corr\_RM=\frac{\sum_{n=0}^{N-1}|x'_R(i)|*|mono\_i(n)|}{\sum_{n=0}^{N-1}|mono\_i(n)|*|mono\_i(n)|},$$

where

|●| indicates obtaining an absolute value.

F24. Calculate, based on corr_LM and corr_RM, an amplitude correlation difference parameter between the left channel time domain signal and the right channel time domain signal that are obtained after long-term smoothing and that are of the current frame.

In an implementation, the amplitude correlation difference parameter diff_lt_corr between the left channel time domain signal and the right channel time domain signal that are obtained after long-term smoothing and that are of the current frame may be calculated in the following manner.

F241. Calculate, based on corr_LM and corr_RM, an amplitude correlation parameter between the left channel time domain signal that is obtained after long-term smoothing and that is of the current frame and the reference channel signal and an amplitude correlation parameter between the right channel time domain signal that is obtained after long-term smoothing and that is of the current frame and the reference channel signal.

In an implementation, the amplitude correlation parameter $tdm\_lt\_corr\_LM\_SM_{cur}$ between the left channel time domain signal that is obtained after long-term smoothing and that is of the current frame and the reference channel signal may be obtained using the following formula:

$$tdm\_lt\_corr\_LM\_SM_{cur}=\alpha*tdm\_lt\_corr\_LM\_SM_{pre}+(1-\alpha)corr\_LM,$$

where $tdm\_lt\_corr\_LM\_SM_{pre}$ is an amplitude correlation parameter between the left channel time domain signal that is obtained after long-term smoothing and that is of the previous frame of the current frame and the reference channel signal, and a is a smoothing factor, and may be a preset real number between 0 and 1, for example, 0, 0.2, 0.5, 0.8, or 1, or may be adaptively obtained through calculation.

In an implementation, the amplitude correlation parameter $tdm\_lt\_corr\_RM\_SM_{cur}$ between the right channel time domain signal that is obtained after long-term smoothing and that is of the current frame and the reference channel signal may be obtained using the following formula:

$$tdm\_lt\_corr\_RM\_SM_{cur}=\beta*tdm\_lt\_corr\_RM\_SM_{pre}+(1-\beta)corr\_LM,$$

where $tdm\_lt\_corr\_RM\_SM_{pre}$ is an amplitude correlation parameter between the right channel time domain signal that is obtained after long-term smoothing and that is of the previous frame of the current frame and the reference channel signal, β is a smoothing factor, and may be a preset real number between 0 and 1, for example, 0, 0.2, 0.5, 0.8, or 1, or may be adaptively obtained through calculation, and a value of the smoothing factor α and a value of the smoothing factor β may be the same, or a value of the smoothing factor α and a value of the smoothing factor β may be different.

In another implementation, $tdm\_lt\_corr\_LM\_SM_{cur}$ and $tdm\_lt\_corr\_RM\_SM_{cur}$ may be obtained in the following manner.

First, corr_LM and corr_RM are modified, to obtain a modified amplitude correlation parameter corr_LM_mod between the left channel time domain signal that is obtained after delay alignment and that is of the current frame and the reference channel signal, and a modified amplitude correlation parameter corr_RM_mod between the right channel time domain signal that is obtained after delay alignment and that is of the current frame and the reference channel signal. In an implementation, when corr_LM and corr_RM are being modified, corr_LM and corr_RM may be directly multiplied by an attenuation factor, and a value of the attenuation factor may be 0.70, 0.75, 0.80, 0.85, 0.90, or the like. In some implementations, a corresponding attenuation factor may further be selected based on a root mean square value of the left channel time domain signal that is obtained after delay alignment and that is of the current frame and the right channel time domain signal that is obtained after delay alignment and that is of the current frame. For example, when the root mean square value of the left channel time domain signal that is obtained after delay alignment and that is of the current frame and the right channel time domain signal that is obtained after delay alignment and that is of the current frame is less than 20, a value of the attenuation factor may be 0.75. When the root mean square value of the left channel time domain signal that is obtained after delay alignment and that is of the current frame and the right channel time domain signal that is obtained after delay alignment and that is of the current frame is greater than or equal to 20, a value of the attenuation factor may be 0.85.

The amplitude correlation parameter diff_lt_corr_LM_tmp between the left channel time domain signal that is obtained after long-term smoothing and that is of the current frame and the reference channel signal is determined based on corr_LM_mod and $tdm\_lt\_corr\_LM\_SM_{pre}$, and the amplitude correlation parameter diff_lt_corr_RM_tmp between the right channel time domain signal that is obtained after long-term smoothing and that is of the current frame and the reference channel signal is determined based on corr_RM_mod and $tdm\_lt\_corr\_RM\_SM_{pre}$. In an implementation, diff_lt_corr_LM_tmp may be obtained by performing weighted summation on corr_LM_mod and $tdm\_lt\_corr\_LM\_SM_{pre}$. For example, $diff\_lt\_corr\_LM\_tmp=corr\_LM\_mod*para1+tdm\_lt\_corr\_LM\_SM_{pre}*(1-para1)$, where a value range of para1 is [0, 1], for example, may be 0.2, 0.5, or 0.8. A manner of determining diff_lt_corr_RM_tmp is similar to that of determining diff_lt_corr_LM_tmp, and details are not described again.

Then, an initial value diff_lt_corr_SM of the amplitude correlation difference parameter between the left channel time domain signal and the right channel time domain signal that are obtained after long-term smoothing and that are of the current frame is determined based on diff_lt_corr_LM_tmp and diff_lt_corr_RM_tmp. In an implementation, diff_lt_corr_SM=diff_lt_corr_LM_tmp_diff_lt_corr_RM_tmp.

Then, an inter-frame change parameter d_lt_corr of the amplitude correlation difference parameter between the left channel time domain signal and the right channel time domain signal that are obtained after long-term smoothing and that are of the current frame is determined based on diff_lt_corr_SM and the amplitude correlation difference parameter tdm_last_diff_lt_corr_SM between the left channel time domain signal and the right channel time domain signal that are obtained after long-term smoothing and that are of the previous frame of the current frame. In an implementation, d_lt_corr=diff_lt_corr_RM−tdm_last_diff_lt_corr_SM.

Then, a left channel smoothing factor and a right channel smoothing factor are adaptively selected based on rms_L, rms_R, $tdm\_lt\_rms\_L\_SM_{cur}$, $tdm\_lt\_rms\_R\_SM_{cur}$, ener_L_dt, ener_R_dt, and diff_lt_corr, and values of the left channel smoothing factor and the right channel smoothing factor may be 0.2, 0.3, 0.5, 0.7, 0.8, or the like. A value of the left channel smoothing factor and a value of the right channel smoothing factor may be the same or may be different. In an implementation, if rms_L and rms_R are less than 800, $tdm\_lt\_rms\_LSM_{cur}$ is less than rms_L*0.9, and $tdm\_lt\_rms\_RSM_{cur}$ is less than rms_R*0.9, the values of the left channel smoothing factor and the right channel smoothing factor may be 0.3, otherwise, the values of the left channel smoothing factor and the right channel smoothing factor may be 0.7.

Finally, $tdm\_lt\_corr\_LM\_SM_{cur}$ is calculated based on the selected left channel smoothing factor, and $tdm\_lt\_corr\_RM\_SM_{cur}$ is calculated based on the selected right channel smoothing factor. In an implementation, the selected left channel smoothing factor may be used to perform weighted summation on diff_lt_corr_LM_tmp and corr_LM to obtain $tdm\_lt\_corr\_LM\_SM_{cur}$, that is, $tdm\_lt\_corr\_LM\_SM_{cur}=diff\_lt\_corr\_LM\_tmp*para1+corr\_LM*(1-para1)$, where para1 is the selected left channel smoothing factor. For calculation of $tdm\_lt\_corr\_RM\_SM_{cur}$, refer to the method for calculating $tdm\_lt\_corr\_LM\_SM_{cur}$, and details are not described again.

It should be noted that, in some implementations of the present disclosure, $tdm\_lt\_corr\_LM\_SM_{cur}$ and $tdm\_lt\_corr\_RM\_SM_{cur}$ may alternatively be calculated in another manner, and a specific manner of obtaining $tdm\_lt\_corr\_LM\_SM_{cur}$ and $tdm\_lt\_corr\_RM\_SM_{cur}$ is not limited in this embodiment of the present disclosure.

F242. Calculate, based on $tdm\_lt\_corr\_LM\_SM_{cur}$ and $tdm\_lt\_corr\_RM\_SM_{cur}$, the amplitude correlation difference parameter diff_lt_corr between the left channel time domain signal and the right channel time domain signal that are obtained after long-term smoothing and that are of the current frame.

In an implementation, diff_lt_corr may be obtained using the following formula:

$$\text{diff\_lt\_corr}=\text{tdm\_lt\_corr\_}LM\_SM_{cur}-\text{tdm\_lt\_corr\_}RM\_SM_{cur}.$$

F25. Convert diff_lt_corr into the channel combination ratio factor and quantize the channel combination ratio factor, to determine the channel combination ratio factor of the current frame and the encoding index of the channel combination ratio factor of the current frame.

In an implementation, diff_lt_corr may be converted into the channel combination ratio factor in the following manner.

F251. Perform mapping processing on diff_lt_corr, so that a value range of the mapped amplitude correlation difference parameter between the left channel and the right channel is within [MAP_MIN,MAP_MAX].

In an embodiment, for specific implementation of F251, refer to processing in FIG. 4, and details are not described again.

F252. Convert diff_lt_corr_map into the channel combination ratio factor.

In an implementation, diff_lt_corr_map may be directly converted into the channel combination ratio factor ratio_SM using the following formula:

$$\text{ratio\_SM}=\frac{1-\cos\left(\frac{\pi}{2}*\text{diff\_lt\_corr\_map}\right)}{2},$$

where cos(●) indicates a cosine operation.

In another implementation, before diff_lt_corr_map is converted into the channel combination ratio factor using the foregoing formula, it may be first determined, at least based on one of $\text{tdm\_lt\_rms\_L\_SM}_{cur}$, $\text{tdm\_lt\_rms\_R\_SM}_{cur}$, ener_L_dt, an encoding parameter of the previous frame of the current frame, the channel combination ratio factor corresponding to the near out-of-phase signal channel combination solution of the current frame, and a channel combination ratio factor corresponding to the near out-of-phase signal channel combination solution of the previous frame of the current frame, whether the channel combination ratio factor of the current frame needs to be updated. The encoding parameter of the previous frame of the current frame may include inter-frame correlation of the primary channel signal of the previous frame of the current frame, inter-frame correlation of the secondary channel signal of the previous frame of the current frame, and the like.

When it is determined that the channel combination ratio factor of the current frame needs to be updated, the foregoing formula used to convert diff_lt_corr_map may be used to convert diff_lt_corr_map into the channel combination ratio factor.

When it is determined that the channel combination ratio factor of the current frame does not need to be updated, the channel combination ratio factor corresponding to the near out-of-phase signal channel combination solution of the previous frame of the current frame and an encoding index corresponding to the channel combination ratio factor may be directly used as the channel combination ratio factor of the current frame and the encoding index corresponding to the channel combination ratio factor.

In an implementation, it may be determined, in the following manner, whether the channel combination ratio factor corresponding to the near out-of-phase signal channel combination solution of the current frame needs to be updated. If the inter-frame correlation of the primary channel signal of the previous frame of the current frame is greater than or equal to 0.5, and the inter-frame correlation of the secondary channel signal of the previous frame of the current frame is greater than or equal to 0.3, the channel combination ratio factor corresponding to the near out-of-phase signal channel combination solution of the current frame is updated, otherwise, no update is performed.

After the channel combination ratio factor of the current frame is determined, the channel combination ratio factor of the current frame may be quantized.

The channel combination ratio factor of the current frame is quantized, to obtain an initial value $\text{ratio\_init\_SM}_{qua}$ of the quantized channel combination ratio factor of the current frame and an encoding index ratio_idx_init_SM of the initial value of the quantized channel combination ratio factor of the current frame. ratio_idx_init_SM ad $\text{ratio\_init\_SM}_{qua}$ meet the following relationship:

$$\text{ratio\_init\_}SM_{qua}=\text{ratio\_tabl\_}SM[\text{ratio\_idx\_init\_}SM],$$

where ratio_tabl_SM is a codebook for scalar quantization of the channel combination ratio factor corresponding to the near out-of-phase signal channel combination solution, where quantization and encoding may use any scalar quantization method, for example, uniform scalar quantization, or non-uniform scalar quantization, and in an implementation, a quantity of bits for encoding during quantization and encoding may be 5 bits, 4 bits, 6 bits, or the like.

The codebook for scalar quantization of the channel combination ratio factor corresponding to the near out-of-phase signal channel combination solution may be the same as a codebook for scalar quantization of a channel combination ratio factor corresponding to the near in-phase signal channel combination solution, so that only one codebook for scalar quantization of a channel combination ratio factor needs to be stored, thereby reducing occupation of storage space. It may be understood that, the codebook for scalar quantization of the channel combination ratio factor corresponding to the near out-of-phase signal channel combination solution may alternatively be different from the codebook for scalar quantization of a channel combination ratio factor corresponding to the near in-phase signal channel combination solution.

To obtain a final value of the channel combination ratio factor of the current frame and an encoding index of the final value of the channel combination ratio factor of the current frame, this embodiment of the present disclosure provides the following four obtaining manners.

In a first obtaining manner. $\text{ratio\_init\_SM}_{qua}$ may be directly used as the final value of the channel combination ratio factor of the current frame, and ratio_idx_init_SM may be directly used as a final encoding index of the channel combination ratio factor of the current frame, that is, the encoding index ratio_idx_SM of the final value of the channel combination ratio factor of the current frame meets:

ratio_idx_SM=ratio_idx_init_SM and the final value of the channel combination ratio factor of the current frame meets:

$$\text{ratio\_}SM=\text{ratio\_tabl}[\text{ratio\_idx\_}SM].$$

In a second obtaining manner.

After $\text{ratio\_init\_SM}_{qua}$ and ratio_idx_init_SM are obtained, $\text{ratio\_init\_SM}_{qua}$ and ratio_idx_init_SM may be modified based on an encoding index of a final value of the channel combination ratio factor of the previous frame of the current frame or the final value of the channel combination ratio factor of the previous frame, a modified encoding index of the channel combination ratio factor of the current frame is used as the final encoding index of the channel combination ratio factor of the current frame, and a modified channel combination ratio factor of the current frame is used as the final value of the channel combination ratio factor of the current frame. Because ratio_init_$SM_{qua}$ and ratio_idx_init_SM may be determined based on each other using a codebook, when ratio_init_$SM_{qua}$ and ratio_idx_init_SM are being modified, any one of the two may be modified, and then a modification value of the other one of the two may be determined based on the codebook.

In an implementation, ratio_idx_init_SM may be modified using the following formula, to obtain ratio_idx_SM.

$$\text{ratio\_idx\_}SM=\varphi*\text{ratio\_idx\_init\_}SM+(1-\varphi)*\text{tdm\_last\_ratio\_idx\_}SM,$$

where ratio_idx_SM is the encoding index of the final value of the channel combination ratio factor of the current frame, tdm_last_ratio_idx_SM is the encoding index of the final value of the channel combination ratio factor of the previous frame of the current frame, V is a modification factor for the channel combination ratio factor corresponding to the near out-of-phase signal channel combination solution, and φ is usually an empirical value, and may be a real number between 0 and 1, for example, a value of φ may be 0, 0.5, 0.8, 0.9, or 1.0.

Correspondingly, the final value of the channel combination ratio factor of the current frame may be determined according to the following formula:

$$\text{ratio\_SM}=\text{ratio\_tabl}[\text{ratio\_idx\_SM}].$$

In a third obtaining manner.

The unquantized channel combination ratio factor of the current frame is directly used as the final value of the channel combination ratio factor of the current frame. In other words, the final value ratio_SM of the channel combination ratio factor of the current frame meets:

$$\text{ratio\_SM}=\frac{1-\cos\left(\frac{\pi}{2}*\text{diff\_lt\_corr\_map}\right)}{2}.$$

In a fourth obtaining manner.

The channel combination ratio factor of the current frame that has not been quantized and encoded is modified based on the final value of the channel combination ratio factor of the previous frame of the current frame, a modified channel combination ratio factor of the current frame is used as the final value of the channel combination ratio factor of the current frame, and then the final value of the channel combination ratio factor of the current frame is quantized to obtain the encoding index of the final value of the channel combination ratio factor of the current frame.

709. Perform encoding mode decision based on a final value of a channel combination solution of the previous frame and a final value of the channel combination solution of the current frame, determine an encoding mode of the current frame, perform time-domain downmixing processing based on the determined encoding mode of the current frame, to obtain a primary channel signal and a secondary channel signal of the current frame.

The encoding mode of the current frame may be determined in at least two preset encoding modes. A specific quantity of preset encoding modes and specific encoding processing manners corresponding to the preset encoding modes may be set and adjusted as required. The quantity of preset encoding modes and the specific encoding processing manners corresponding to the preset encoding modes are not limited in this embodiment of the present disclosure.

In a possible implementation, the channel combination solution flag of the current frame is denoted as tdm_SM_flag, the channel combination solution flag of the previous frame of the current frame is denoted as tdm_last_SM_flag, and the channel combination solution of the previous frame and the channel combination solution of the current frame may be denoted as (tdm_last_SM_flag, tdm_SM_flag).

If it is assumed that the near in-phase signal channel combination solution is denoted by 0, and the near out-of-phase signal channel combination solution is denoted by 1, a combination of the channel combination solution of the previous frame of the current frame and the channel combination solution of the current frame may be denoted as (01), (11), (10), and (00), and the four cases respectively correspond to an encoding mode 1, an encoding mode 2, an encoding mode 3, and an encoding mode 4. In an implementation, the determined encoding mode of the current frame may be denoted as stereo_tdm_coder_type, and a value of stereo_tdm_coder_type may be 0, 1, 2, or 3, which respectively corresponds to the foregoing four cases (01), (11), (10), and (00).

In an embodiment, if the encoding mode of the current frame is the encoding mode 1 (stereo_tdm_coder_type=0), time-domain downmixing processing is performed using a downmixing processing method corresponding to a transition from the near in-phase signal channel combination solution to the near out-of-phase signal channel combination solution.

If the encoding mode of the current frame is the encoding mode 2 (stereo_tdm_coder_type=1), time-domain downmixing processing is performed using a time-domain downmixing processing method corresponding to the near out-of-phase signal channel combination solution.

If the encoding mode of the current frame is the encoding mode 3 (stereo_tdm_coder_type=2), time-domain downmixing processing is performed using a downmixing processing method corresponding to a transition from the near out-of-phase signal channel combination solution to the near in-phase signal channel combination solution.

If the encoding mode of the current frame is the encoding mode 4 (stereo_tdm_coder_type=3), time-domain downmixing processing is performed using a time-domain downmixing processing method corresponding to the near in-phase signal channel combination solution.

Specific implementation of the time-domain downmixing processing method corresponding to the near in-phase signal channel combination solution may include any one of the following three implementations.

In a first processing manner.

If it is assumed that the channel combination ratio factor corresponding to the near in-phase signal channel combination solution of the current frame is a fixed coefficient, a primary channel signal Y(n) and a secondary channel signal X(n) that are obtained after time-domain downmixing processing and that are of the current frame may be obtained according to the following formula:

$$\begin{bmatrix} Y(n) \\ X(n) \end{bmatrix} = \begin{bmatrix} 0.5 & 0.5 \\ 0.5 & -0.5 \end{bmatrix} * \begin{bmatrix} x'_L(n) \\ x'_R(n) \end{bmatrix},$$

where in the formula, a value of the fixed coefficient is set to 0.5, and in actual application, the fixed coefficient may alternatively be set to another value, for example, 0.4 or 0.6.

In a second processing manner.

Time-domain downmixing processing is performed based on the determined channel combination ratio factor ratio corresponding to the near in-phase signal channel combination solution of the current frame, and then a primary channel signal Y(n) and a secondary channel signal X(n) that are obtained after time-domain downmixing processing and that are of the current frame may be obtained according to the following formula:

$$\begin{bmatrix} Y(n) \\ X(n) \end{bmatrix} = \begin{bmatrix} \text{ratio} & 1-\text{ratio} \\ 1-\text{ratio} & -\text{ratio} \end{bmatrix} * \begin{bmatrix} x'_L(n) \\ x'_R(n) \end{bmatrix}.$$

In a third processing manner.

On the basis of the first implementation or the second implementation of the time-domain downmixing processing method corresponding to the near in-phase signal channel combination solution, segmented time-domain downmixing processing is performed.

Segmented downmixing processing corresponding to the transition from the near in-phase signal channel combination solution to the near out-of-phase signal channel combination solution includes three parts downmixing processing 1, downmixing processing 2, and downmixing processing 3. Specific processing is as follows.

The downmixing processing 1 corresponds to an end section of processing using the near in-phase signal channel combination solution. Time-domain downmixing processing is performed using a channel combination ratio factor corresponding to the near in-phase signal channel combination solution of the previous frame and using a time-domain downmixing processing method corresponding to the near in-phase signal channel combination solution, so that a processing manner the same as that in the previous frame is used to ensure continuity of processing results in the current frame and the previous frame.

The downmixing processing 2 corresponds to an overlapping section of processing using the near in-phase signal channel combination solution and processing using the near out-of-phase signal channel combination solution. Weighted processing is performed on a processing result 1 obtained through time-domain downmixing performed using a channel combination ratio factor corresponding to the near in-phase signal channel combination solution of the previous frame and using a time-domain downmixing processing method corresponding to the near in-phase signal channel combination solution and a processing result 2 obtained through time-domain downmixing performed using a channel combination ratio factor corresponding to the near out-of-phase signal channel combination solution of the current frame and using a time-domain downmixing processing method corresponding to the near out-of-phase signal channel combination solution, to obtain a final processing result, where the weighted processing is fade-out of the result 1 and fade-in of the result 2, and a sum of weighting coefficients of the result 1 and the result 2 at a mutually corresponding point is 1, so that continuity of processing results obtained using two channel combination solutions in the overlapping section and in a start section and the end section is ensured.

The downmixing processing 3 corresponds to the start section of processing using the near out-of-phase signal channel combination solution. Time-domain downmixing processing is performed using a channel combination ratio factor corresponding to the near out-of-phase signal channel combination solution of the current frame and using a time-domain downmixing processing method corresponding to the near out-of-phase signal channel combination solution, so that a processing manner the same as that in a next frame is used to ensure continuity of processing results in the current frame and the previous frame.

Specific implementation of the time-domain downmixing processing method corresponding to the near out-of-phase signal channel combination solution may include the following implementations.

In a first implementation.

Time-domain downmixing processing is performed based on the determined channel combination ratio factor ratio_SM corresponding to the near out-of-phase signal channel combination solution, and then a primary channel signal Y(n) and a secondary channel signal X(n) that are obtained after time-domain downmixing processing and that are of the current frame may be obtained according to the following formula:

$$\begin{bmatrix} Y(n) \\ X(n) \end{bmatrix} = \begin{bmatrix} \alpha_1 & -\alpha_2 \\ -\alpha_2 & -\alpha_1 \end{bmatrix} * \begin{bmatrix} x'_L(n) \\ x'_R(n) \end{bmatrix},$$

$$\alpha_1 = \text{ratio\_SM},$$

$$\alpha_2 = 1 - \text{ratio\_SM}.$$

In a second implementation.

If it is assumed that the channel combination ratio factor corresponding to the near out-of-phase signal channel combination solution of the current frame is a fixed coefficient, a primary channel signal Y(n) and a secondary channel signal X(n) that are obtained after time-domain downmixing processing and that are of the current frame may be obtained according to the following formula:

$$\begin{bmatrix} Y(n) \\ X(n) \end{bmatrix} = \begin{bmatrix} 0.5 & -0.5 \\ -0.5 & -0.5 \end{bmatrix} * \begin{bmatrix} x'_L(n) \\ x'_R(n) \end{bmatrix},$$

where in the formula, a value of the fixed coefficient is set to 0.5, and in actual application, the fixed coefficient may alternatively be set to another value, for example, 0.4 or 0.6.

In a third implementation.

When time-domain downmixing processing is being performed, delay compensation is performed considering a delay of a codec. It is assumed that delay compensation at an encoder end is delay_com, and a primary channel signal Y(n) and a secondary channel signal X(n) that are obtained after time-domain downmixing processing may be obtained according to the following formula:

$$\begin{bmatrix} Y(n) \\ X(n) \end{bmatrix} = \begin{bmatrix} \alpha_{1\_pre} & -\alpha_{2\_pre} \\ -\alpha_{2\_pre} & -\alpha_{1\_pre} \end{bmatrix} * \begin{bmatrix} x'_L(n) \\ x'_R(n) \end{bmatrix}, \text{ if } 0 \le n < N - \text{delay\_com}$$

$$\begin{bmatrix} Y(n) \\ X(n) \end{bmatrix} = \begin{bmatrix} \alpha_1 & -\alpha_2 \\ -\alpha_2 & -\alpha_1 \end{bmatrix} * \begin{bmatrix} x'_L(n) \\ x'_R(n) \end{bmatrix}, \text{ if } N - \text{delay\_com} \le n < N$$

$\alpha_1$=ratio_SM, where $a_2$=1−ratio_SM $\alpha_{1\_pre}$=tdm_last_ratio_SM, $\alpha_{2\_pre}$=1−tdm_last_ratio_SM tdm_last_ratio_SM=ratio_tabl[tdm_last_ratio_idx_SM]

tdm_last_ratio_idx_SM is a final encoding index of the channel combination ratio factor corresponding to the near out-of-phase signal channel combination solution of the previous frame of the current frame, and tdm_last_ratio_SM is a final value of the channel combination ratio factor corresponding to the near out-of-phase signal channel combination solution of the previous frame of the current frame.

In a fourth implementation.

When time-domain downmixing processing is performed, delay compensation is performed based on a delay of the codec, and a case in which tdm_last_ratio is not equal to ratio_SM may occur. In this case, a primary channel signal Y(n) and a secondary channel signal X(n) that are obtained after time-domain downmixing processing and that are of the current frame may be obtained according to the following formula:

$$\text{if } 0 \le n < N - \text{delay\_com}:$$

$$\begin{bmatrix} Y(n) \\ X(n) \end{bmatrix} = \begin{bmatrix} \alpha_{1\_pre} & -\alpha_{2\_pre} \\ -\alpha_{2\_pre} & -\alpha_{1\_pre} \end{bmatrix} * \begin{bmatrix} x'_L(n) \\ x'_R(n) \end{bmatrix},$$

$$\text{if } N - \text{delay\_com} \le n < N - \text{delay\_com} + NOVA:$$

$$\begin{bmatrix} Y(n) \\ X(n) \end{bmatrix} = \text{fade\_out}(i) * \begin{bmatrix} \alpha_{1\_pre} & -\alpha_{2\_pre} \\ -\alpha_{2\_pre} & -\alpha_{1\_pre} \end{bmatrix} * \begin{bmatrix} x'_L(n) \\ x'_R(n) \end{bmatrix} + \text{fade\_in}(i) * \begin{bmatrix} \alpha_1 & -\alpha_2 \\ -\alpha_2 & -\alpha_1 \end{bmatrix} * \begin{bmatrix} x'_L(n) \\ x'_R(n) \end{bmatrix},$$

$$i = 0, 1, \ldots, NOVA - 1$$

$$\text{if } N - \text{delay\_com} + NOVA \le n < N:$$

$$\begin{bmatrix} Y(n) \\ X(n) \end{bmatrix} = \begin{bmatrix} \alpha_1 & -\alpha_2 \\ -\alpha_2 & -\alpha_1 \end{bmatrix} * \begin{bmatrix} x'_L(n) \\ x'_R(n) \end{bmatrix},$$

fade_in(i) is a fade-in factor, and meets $$\text{fade\_in}(i) = \frac{i}{NOVA},$$

NOVA is a transition processing length, a value of NOVA may be an integer greater than 0 and less than N, for example, the value may be 1, 40, 50, or the like, and fade_out(i) is a fade-outfactor, and meets $$\text{fade\_out}(i) = 1 - \frac{i}{NOVA}.$$

In a fifth implementation, On the basis of the first implementation, the second implementation, and the third implementation of the time-domain downmixing processing method corresponding to the near out-of-phase signal channel combination solution, segmented time-domain downmixing processing is performed.

Segmented downmixing processing corresponding to a transition from the near out-of-phase signal channel combination solution to the near in-phase signal channel combination solution is similar to the segmented downmixing processing corresponding to the transition from the near in-phase signal channel combination solution to the near out-of-phase signal channel combination solution, and also includes three parts, downmixing processing 4, downmixing processing 5, and downmixing processing 6. Specific processing is as follows.

The downmixing processing 4 corresponds to an end section of processing using the near out-of-phase signal channel combination solution. Time-domain downmixing processing is performed using a channel combination ratio factor corresponding to the near out-of-phase signal channel combination solution of the previous frame and using a time-domain downmixing processing method corresponding to a second channel combination solution, so that a processing manner the same as that in the previous frame is used to ensure continuity of processing results in the current frame and the previous frame.

The downmixing processing 5 corresponds to an overlapping section of processing using the near out-of-phase signal channel combination solution and processing using the near in-phase signal channel combination solution. Weighted processing is performed on a processing result 1 obtained through time-domain downmixing performed using a channel combination ratio factor corresponding to the near out-of-phase signal channel combination solution of the previous frame and using a time-domain downmixing processing method corresponding to the near out-of-phase signal channel combination solution and a processing result 2 obtained through time-domain downmixing performed using a channel combination ratio factor corresponding to the near in-phase signal channel combination solution of the current frame and using a time-domain downmixing processing method corresponding to the near in-phase signal channel combination solution, to obtain a final processing result, where the weighted processing is fade-out of the result 1 and fade-in of the result 2, and a sum of weighting coefficients of the result 1 and the result 2 at a mutually corresponding point is 1, so that continuity of processing results obtained using two channel combination solutions in the overlapping section and in a start section and the end section is ensured.

The downmixing processing 6 corresponds to the start section of processing using the near in-phase signal channel combination solution. Time-domain downmixing processing is performed using a channel combination ratio factor corresponding to the near in-phase signal channel combination solution of the current frame and using a time-domain downmixing processing method corresponding to the near in-phase signal channel combination solution, so that a processing manner the same as that in a next frame is used to ensure continuity of processing results in the current frame and the previous frame.

710. Separately encode the primary channel signal and the secondary channel signal.

In an implementation, bit allocation may be first performed for encoding of the primary channel signal and the secondary channel signal of the current frame based on parameter information obtained during encoding of a primary channel signal and/or a secondary channel signal of the previous frame of the current frame and total bits for encoding of the primary channel signal and the secondary channel signal of the current frame. Then, the primary channel signal and the secondary channel signal are separately encoded based on a result of bit allocation, to obtain an encoding index of the primary channel signal and an encoding index of the secondary channel signal. Any mono audio encoding technology may be used for encoding the primary channel signal and the secondary channel signal, and details are not described herein.

711. Write the encoding index of the channel combination ratio factor of the current frame, an encoding index of the primary channel signal of the current frame, an encoding index of the secondary channel signal of the current frame, and the channel combination solution flag of the current frame into a bitstream.

It may be understood that, before the encoding index of the channel combination ratio factor of the current frame, the encoding index of the primary channel signal of the current frame, the encoding index of the secondary channel signal of the current frame, and the channel combination solution flag of the current frame are written into the bitstream, at least one of the encoding index of the channel combination ratio factor of the current frame, the encoding index of the primary channel signal of the current frame, the encoding index of the secondary channel signal of the current frame, or the channel combination solution flag of the current frame may be further processed. In this case, information written into the bitstream is related information obtained after processing.

In an embodiment, if the channel combination solution flag tdm_SM_flag of the current frame is corresponding to the near in-phase signal channel combination solution, the final encoding index ratio_idx of the channel combination ratio factor corresponding to the near in-phase signal channel combination solution of the current frame is written into the bitstream. If the channel combination solution flag tdm_SM_flag of the current frame is corresponding to the near out-of-phase signal channel combination solution, the final encoding index ratio_idx_SM of the channel combination ratio factor corresponding to the near out-of-phase signal channel combination solution of the current frame is written into the bitstream. For example, if tdm_SM_flag=0, the final encoding index ratio_idx of the channel combination ratio factor corresponding to the near in-phase signal channel combination solution of the current frame is written into the bitstream, or if tdm_SM_flag=1, the final encoding index ratio_idx_SM of the channel combination ratio factor corresponding to the near out-of-phase signal channel combination solution of the current frame is written into the bitstream.

It can be learned from the foregoing description that, when stereo encoding is performed in this embodiment, the channel combination encoding solution of the current frame is first determined, and then the quantized channel combination ratio factor of the current frame and the encoding index of the quantized channel combination ratio factor are obtained based on the determined channel combination encoding solution, so that the obtained primary channel signal and secondary channel signal of the current frame meet a characteristic of the current frame, it is ensured that a sound image of a synthesized stereo audio signal obtained after encoding is stable, drift phenomena are reduced, and encoding quality is improved.

It should be noted that, to make the description brief the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

Figure 8:
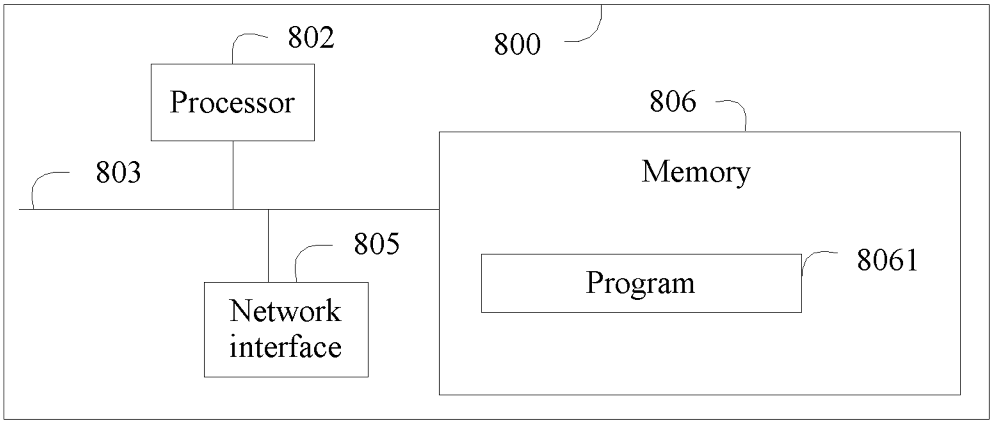
FIG. 8 is a structural diagram of a stereo encoding device according to an embodiment of the present disclosure.

FIG. 8 depicts a structure of a stereo encoding apparatus 800 according to another embodiment of the present disclosure. The apparatus includes at least one processor 802 (for example, a central processing unit (CPU)), at least one network interface 805 or another communications interface, a memory 806, and at least one communications bus 803 configured to implement connection and communication between these apparatuses. The processor 802 is configured to execute an executable module stored in the memory 806, for example, a computer program. The memory 806 may include a high-speed random-access memory (RAM), or may include a non-volatile memory, for example, at least one disk memory. Communication and connection between a gateway in the system and at least one of other network elements are implemented using the at least one network interface 805 (which may be wired or wireless), for example, using the Internet, a wide area network, a local area network, and a metropolitan area network.

In some implementations, a program 8061 is stored in the memory 806, and the program 8061 may be executed by the processor 802. The stereo encoding method provided in the embodiments of the present disclosure may be performed when the program is executed.

Figure 9:
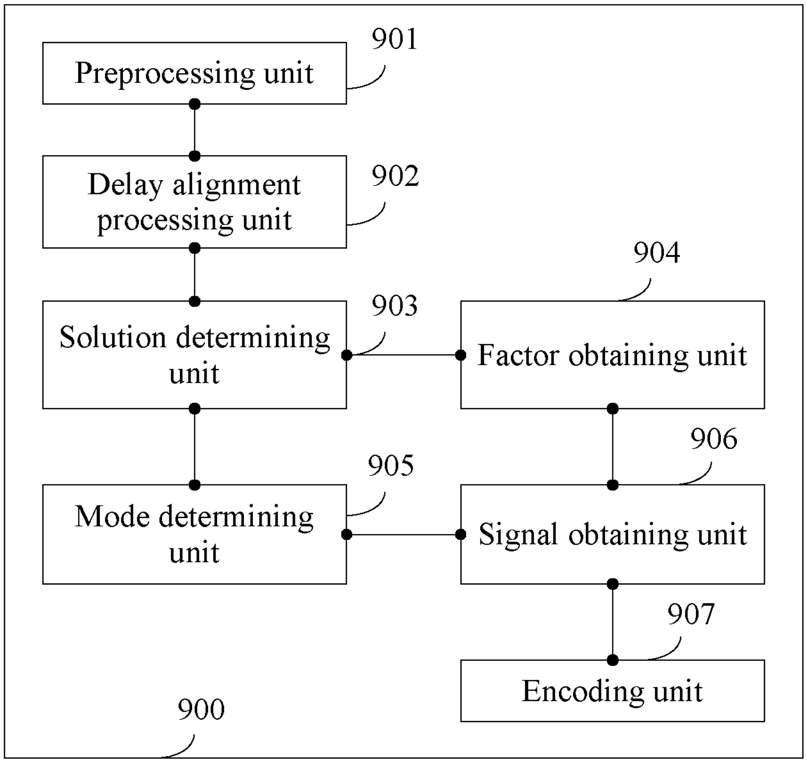
FIG. 9 is a structural diagram of a stereo encoding device according to another embodiment of the present disclosure.

FIG. 9 depicts a structure of a stereo encoder 900 according to an embodiment of the present disclosure. The stereo encoder 900 includes a preprocessing unit 901, configured to perform time domain preprocessing on a left channel time domain signal and a right channel time domain signal that are of a current frame of a stereo audio signal, to obtain a preprocessed left channel time domain signal and a preprocessed right channel time domain signal that are of the current frame, a delay alignment processing unit 902, configured to perform delay alignment processing on the preprocessed left channel time domain signal and the preprocessed right channel time domain signal that are of the current frame, to obtain the left channel time domain signal obtained after delay alignment and the right channel time domain signal obtained after delay alignment that are of the current frame, a solution determining unit 903, configured to determine a channel combination solution of the current frame based on the left channel time domain signal obtained after delay alignment and the right channel time domain signal obtained after delay alignment that are of the current frame, a factor obtaining unit 904, configured to obtain a quantized channel combination ratio factor of the current frame and an encoding index of the quantized channel combination ratio factor based on the determined channel combination solution of the current frame, and the left channel time domain signal obtained after delay alignment and the right channel time domain signal obtained after delay alignment that are of the current frame, a mode determining unit 905, configured to determine an encoding mode of the current frame based on the determined channel combination solution of the current frame, a signal obtaining unit 906, configured to downmix, based on the encoding mode of the current frame and the quantized channel combination ratio factor of the current frame, the left channel time domain signal obtained after delay alignment and the right channel time domain signal obtained after delay alignment that are of the current frame, to obtain a primary channel signal and a secondary channel signal of the current frame, and an encoding unit 907, configured to encode the primary channel signal and the secondary channel signal of the current frame.

In an implementation, the solution determining unit 903 may be configured to determine a signal type of the current frame based on the left channel time domain signal obtained after delay alignment and the right channel time domain signal obtained after delay alignment that are of the current frame, where the signal type includes a near in-phase signal or a near out-of-phase signal, and correspondingly determine the channel combination solution of the current frame at least based on the signal type of the current frame, where the channel combination solution includes a near out-of-phase signal channel combination solution used for processing a near out-of-phase signal or a near in-phase signal channel combination solution used for processing a near in-phase signal.

In an implementation, if the channel combination solution of the current frame is the near out-of-phase signal channel combination solution used for processing a near out-of-phase signal, the factor obtaining unit 904 may be configured to obtain an amplitude correlation difference parameter between the left channel time domain signal that is obtained after long-term smoothing and that is of the current frame and the right channel time domain signal that is obtained after long-term smoothing and that is of the current frame based on the left channel time domain signal obtained after delay alignment and the right channel time domain signal obtained after delay alignment that are of the current frame, convert the amplitude correlation difference parameter into a channel combination ratio factor of the current frame, and quantize the channel combination ratio factor of the current frame, to obtain the quantized channel combination ratio factor of the current frame and the encoding index of the quantized channel combination ratio factor.

In an implementation, when obtaining the amplitude correlation difference parameter between the left channel time domain signal obtained after long-term smoothing and the right channel time domain signal obtained after long-term smoothing that are of the current frame based on the left channel time domain signal obtained after delay alignment and the right channel time domain signal obtained after delay alignment that are of the current frame, the factor obtaining unit 904 may be configured to determine a reference channel signal of the current frame based on the left channel time domain signal obtained after delay alignment and the right channel time domain signal obtained after delay alignment that are of the current frame, calculate a left channel amplitude correlation parameter between the left channel time domain signal that is obtained after delay alignment and that is of the current frame and the reference channel signal, and a right channel amplitude correlation parameter between the right channel time domain signal that is obtained after delay alignment and that is of the current frame and the reference channel signal, and calculate the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter.

In an implementation, when calculating the amplitude correlation difference parameter between the left channel time domain signal obtained after long-term smoothing and the right channel time domain signal obtained after long-term smoothing that are of the current frame based on the left channel amplitude correlation parameter and the right channel amplitude correlation parameter, the factor obtaining unit 904 may be configured to determine an amplitude correlation parameter between the left channel time domain signal that is obtained after long-term smoothing and that is of the current frame and the reference channel signal based on the left channel amplitude correlation parameter, determine an amplitude correlation parameter between the right channel time domain signal that is obtained after long-term smoothing and that is of the current frame and the reference channel signal based on the right channel amplitude correlation parameter, and determine the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal.

In an implementation, when determining the amplitude correlation difference parameter between the left channel time domain signal obtained after long-term smoothing and the right channel time domain signal obtained after long-term smoothing that are of the current frame based on the amplitude correlation parameter between the left channel time domain signal that is obtained after long-term smoothing and that is of the current frame and the reference channel signal and the amplitude correlation parameter between the right channel time domain signal that is obtained after long-term smoothing and that is of the current frame and the reference channel signal, the factor obtaining unit 904 may be configured to determine the amplitude correlation difference parameter between the left channel time domain signal obtained after long-term smoothing and the right channel time domain signal obtained after long-term smoothing that are of the current frame using the following formula:

$$\text{diff\_lt\_corr}=\text{tdm\_lt\_corr\_LM\_SM}_{cur}\times\text{tdm\_lt\_corr\_RM\_SM}_{cur},$$

where diff_lt_corr is the amplitude correlation difference parameter between the left channel time domain signal obtained after long-term smoothing and the right channel time domain signal obtained after long-term smoothing that are of the current frame, $\text{tdm\_lt\_corr\_LM\_SM}_{cur}$ is the amplitude correlation parameter between the left channel time domain signal that is obtained after long-term smoothing and that is of the current frame and the reference channel signal, and $\text{tdm\_lt\_corr\_RM\_SM}_{cur}$ is the amplitude correlation parameter between the right channel time domain signal that is obtained after long-term smoothing and that is of the current frame and the reference channel signal.

In an implementation, when determining the amplitude correlation parameter between the left channel time domain signal that is obtained after long-term smoothing and that is of the current frame and the reference channel signal based on the left channel amplitude correlation parameter, the factor obtaining unit 904 may be configured to determine the amplitude correlation parameter $\text{tdm\_lt\_corr\_LM\_SM}_{cur}$ between the left channel time domain signal that is obtained after long-term smoothing and that is of the current frame and the reference channel signal using the following formula:

$$\text{tdm\_lt\_corr\_}LM\_SM_{cur}=\alpha*\text{tdm\_lt\_corr\_}LM\_SM_{pre}+(1-\alpha)\text{corr\_}LM,$$

where $\text{tdm\_lt\_corr\_LM\_SM}_{pre}$ is an amplitude correlation parameter between a left channel time domain signal that is obtained after long-term smoothing and that is of a previous frame of the current frame and the reference channel signal, a is a smoothing factor, a value range of a is [0, 1], and corr_LM is the left channel amplitude correlation parameter, and the determining an amplitude correlation parameter between the right channel time domain signal that is obtained after long-term smoothing and that is of the current frame and the reference channel signal based on the right channel amplitude correlation parameter includes determining the amplitude correlation parameter $tdm\_lt\_corr\_RM\_SM_{cur}$ between the right channel time domain signal that is obtained after long-term smoothing and that is of the current frame and the reference channel signal using the following formula:

$$tdm\_lt\_corr\_RM\_SM_{cur}=\beta*tdm\_lt\_corr\_RM\_SM_{pre}+(1-\beta)corr\_LM,$$

where $tdm\_lt\_corr\_RM\_SM_{pre}$ is an amplitude correlation parameter between a right channel time domain signal that is obtained after long-term smoothing and that is of the previous frame of the current frame and the reference channel signal, Q is a smoothing factor, a value range of Q is [0, 1], and corr_RM is the right channel amplitude correlation parameter.

In an implementation, when calculating the left channel amplitude correlation parameter between the left channel time domain signal that is obtained after delay alignment and that is of the current frame and the reference channel signal, and the right channel amplitude correlation parameter between the right channel time domain signal that is obtained after delay alignment and that is of the current frame and the reference channel signal, the factor obtaining unit 904 may be configured to determine the left channel amplitude correlation parameter corr_LM between the left channel time domain signal that is obtained after delay alignment and that is of the current frame and the reference channel signal using the following formula:

$$corr\_LM=\frac{\sum_{n=0}^{N-1}|x'_L(n)|*|mono\_i(n)|}{\sum_{n=0}^{N-1}|mono\_i(n)|*|mono\_i(n)|},$$

where $x'_L(n)$ is the left channel time domain signal that is obtained after delay alignment and that is of the current frame, N is a frame length of the current frame, and mono_i(n) is the reference channel signal, and determine the right channel amplitude correlation parameter corr_RM between the right channel time domain signal that is obtained after delay alignment and that is of the current frame and the reference channel signal using the following formula:

$$corr\_RM=\frac{\sum_{n=0}^{N-1}|x'_R(n)|*|mono\_i(n)|}{\sum_{n=0}^{N-1}|mono\_i(n)|*|mono\_i(n)|},$$

where $x'_R(n)$ is the right channel time domain signal that is obtained after delay alignment and that is of the current frame.

In an implementation, when converting the amplitude correlation difference parameter into the channel combination ratio factor of the current frame, the factor obtaining unit 904 may be configured to perform mapping processing on the amplitude correlation difference parameter to obtain a mapped amplitude correlation difference parameter, where a value of the mapped amplitude correlation difference parameter is within a preset amplitude correlation difference parameter value range, and convert the mapped amplitude correlation difference parameter into the channel combination ratio factor of the current frame.

In an implementation, when performing mapping processing on the amplitude correlation difference parameter, the factor obtaining unit 904 may be configured to perform amplitude limiting on the amplitude correlation difference parameter, to obtain an amplitude correlation difference parameter obtained after amplitude limiting, and map the amplitude correlation difference parameter obtained after amplitude limiting, to obtain the mapped amplitude correlation difference parameter.

In an implementation, when performing amplitude limiting on the amplitude correlation difference parameter, to obtain the amplitude correlation difference parameter obtained after amplitude limiting, the factor obtaining unit 904 may be configured to perform amplitude limiting on the amplitude correlation difference parameter using the following formula:

$$diff\_lt\_corr\_limit=\begin{cases}RATIO\_MAX, & \text{when } diff\_lt\_corr>RATIO\_MAX\\ diff\_lt\_corr, & \text{in other cases}\\ RATIO\_MIN, & \text{when } diff\_lt\_corr<RATIO\_MIN\end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting, RATIO_MIN is a minimum value of the amplitude correlation difference parameter obtained after amplitude limiting, and RATIO_MAX>RATIO_MIN, and for values of RATIO_MAX ad RATIO_MIN, refer to the foregoing description, and details are not described again.

In an implementation, when performing amplitude limiting on the amplitude correlation difference parameter, to obtain the amplitude correlation difference parameter obtained after amplitude limiting, the factor obtaining unit 904 may be configured to perform amplitude limiting on the amplitude correlation difference parameter using the following formula:

$$diff\_lt\_corr\_limit=\begin{cases}RATIO\_MAX, & \text{when } diff\_lt\_corr>RATIO\_MAX\\ diff\_lt\_corr, & \text{in other cases}\\ -RATIO\_MAX, & \text{when } diff\_lt\_corr<-RATIO\_MIN\end{cases},$$

where diff_lt_corr_limit is the amplitude correlation difference parameter obtained after amplitude limiting, diff_lt_corr is the amplitude correlation difference parameter, RATIO_MAX is a maximum value of the amplitude correlation difference parameter obtained after amplitude limiting.

In an implementation, when mapping the amplitude correlation difference parameter obtained after amplitude limiting, to obtain the mapped amplitude correlation difference parameter, the factor obtaining unit 904 may be configured to map the amplitude correlation difference parameter using the following formula:

$$\text{diff\_lt\_corr\_map} = \begin{cases} A_1 * \text{diff\_lt\_corr\_limit} + B_1, & \text{when diff\_lt\_corr\_limit} > \text{RATIO\_HIGH} \\ A_2 * \text{diff\_lt\_corr\_limit} + B_2, & \text{when diff\_lt\_corr\_limit} < \text{RATIO\_LOW} \\ A_3 * \text{diff\_lt\_corr\_limit} + B_3, & \text{when RATIO\_LOW} \le \text{diff\_lt\_corr\_limit} \le \text{RATIO\_HIGH} \end{cases},$$

where $$A_1 = \frac{\text{MAP\_MAX} - \text{MAP\_HIGH}}{\text{RATIO\_MAX} - \text{RATIO\_HIGH}},$$

$$B_1 = \text{MAP\_MAX} - \text{RATIO\_MAX} * A_1 \text{ or } B_1 = \text{MAP\_HIGH} - \text{RATIO\_HIGH} * A_1,$$

$$A_2 = \frac{\text{MAP\_LOW} - \text{MAP\_MIN}}{\text{RATIO\_LOW} - \text{RATIO\_MIN}},$$

$$B_2 = \text{MAP\_LOW} - \text{RATIO\_LOW} * A_2 \text{ or } B_2 = \text{MAP\_MIN} - \text{RATIO\_MIN} * A_2,$$

$$A_3 = \frac{\text{MAP\_HIGH} - \text{MAP\_LOW}}{\text{RATIO\_HIGH} - \text{RATIO\_LOW}},$$

$$B_3 = \text{MAP\_HIGH} - \text{RATIO\_HIGH} * A_3 \text{ or } B_3 = \text{MAP\_LOW} - \text{RATIO\_LOW} * A_3,$$

where diff_lt_corr_limit is the amplitude correlation difference parameter obtained after amplitude limiting, diff_lt_corr_map is the mapped amplitude correlation difference parameter, MAP_MAX is a maximum value of the mapped amplitude correlation difference parameter, MAP_HIGH is a high threshold of a value of the mapped amplitude correlation difference parameter, MAP_LOW is a low threshold of a value of the mapped amplitude correlation difference parameter, MAP_MIN is a minimum value of the mapped amplitude correlation difference parameter, MAP_MAX>MAP_HIGH>MAP_LOW>MAP_MIN, and for specific values of MAP_MAX, MAP_HIGH, MAP_LOW, and MAP_MIN, refer to the foregoing description, and details are not described again, and RATIO_MAX is a maximum value of the amplitude correlation difference parameter obtained after amplitude limiting, RATIO_HIGH is a high threshold of the amplitude correlation difference parameter obtained after amplitude limiting, RATIO_LOW is a low threshold of the amplitude correlation difference parameter obtained after amplitude limiting, RATIO_MIN is a minimum value of the amplitude correlation difference parameter obtained after amplitude limiting, RATIO_MAX>RATIO_HIGH>RATIO_LOW>RATIO_MIN, and for values of RATIO_HIGH and RATIO_LOW, refer to the foregoing description, and details are not described again.

In an implementation, when mapping the amplitude correlation difference parameter obtained after amplitude limiting, to obtain the mapped amplitude correlation difference parameter, the factor obtaining unit 904 may be configured to map the amplitude correlation difference parameter using the following formula:

$$\text{diff\_lt\_corr\_map} = \begin{cases} 1.08 * \text{diff\_lt\_corr\_limit} + 0.38, & \text{when diff\_lt\_corr\_limit} > 0.5 * \text{RATIO\_MAX} \\ 0.64 * \text{diff\_lt\_corr\_limit} + 1.28, & \text{when diff\_lt\_corr\_limit} < -0.5 * \text{RATIO\_MAX} \\ 0.26 * \text{diff\_lt\_corr\_limit} + 0.995, & \text{in other cases} \end{cases},$$

where diff_lt_corr_map is the mapped amplitude correlation difference parameter, diff_lt_corr_limit is the amplitude correlation difference parameter obtained after amplitude limiting, and RATIO_MAX is a maximum value of the amplitude correlation difference parameter obtained after amplitude limiting.

In an implementation, when mapping the amplitude correlation difference parameter obtained after amplitude limiting, to obtain the mapped amplitude correlation difference parameter, the factor obtaining unit 904 may be configured to map the amplitude correlation difference parameter using the following formula:

$$\text{diff\_lt\_corr\_map} = a * b^{\text{diff\_lt\_corr\_limit}} + c,$$

where diff_lt_corr_map is the mapped amplitude correlation difference parameter, diff_lt_corr_limit is the amplitude correlation difference parameter obtained after amplitude limiting, a value range of a is [0, 1], a value range of b is [1.5, 3], and a value range of c is [0, 0.5].

In an implementation, when mapping the amplitude correlation difference parameter obtained after amplitude limiting, to obtain the mapped amplitude correlation difference parameter, the factor obtaining unit 904 may be configured to map the amplitude correlation difference parameter using the following formula:

$$\text{diff\_lt\_corr\_map} = a * (\text{diff\_lt\_corr\_limit} + 1.5)^2 + b * (\text{diff\_lt\_corr\_limit} + 1.5) + c,$$

where diff_lt_corr_map is the mapped amplitude correlation difference parameter, diff_lt_corr_limit is the amplitude correlation difference parameter obtained after amplitude limiting, a value range of a is [0.08, 0.12], a value range of b is [0.03, 0.07], and a value range of c is [0.1, 0.3].

In an implementation, when converting the mapped amplitude correlation difference parameter into the channel combination ratio factor of the current frame, the factor obtaining unit 904 may be configured to convert the mapped amplitude correlation difference parameter into the channel combination ratio factor of the current frame using the following formula:

$$\text{ratio\_SM} = \frac{1 - \cos\left(\frac{\pi}{2} * \text{diff\_lt\_corr\_map}\right)}{2},$$

where ratio_SM is the channel combination ratio factor of the current frame, and diff_lt_corr_map is the mapped amplitude correlation difference parameter.

It can be learned from the foregoing description that, when stereo encoding is performed in this embodiment, the channel combination encoding solution of the current frame is first determined, and then the quantized channel combination ratio factor of the current frame and the encoding index of the quantized channel combination ratio factor are obtained based on the determined channel combination encoding solution, so that the obtained primary channel signal and secondary channel signal of the current frame meet a characteristic of the current frame, it is ensured that a sound image of a synthesized stereo audio signal obtained after encoding is stable, drift phenomena are reduced, and encoding quality is improved.

Content such as information exchange and an execution process between the modules in the stereo encoder is based on a same idea as the method embodiments of the present disclosure. Therefore, for detailed content, refer to descriptions in the method embodiments of the present disclosure, and details are not further described herein.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a read-only memory ( ), or a RAM.

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made by a person of ordinary skill in the art according to the idea of the present disclosure. Therefore, this specification shall not be construed as a limitation on the present disclosure.

What is claimed is:

1. A method comprising:

performing time domain preprocessing on a first channel signal of a current frame of a multi-channel audio signal to obtain a first preprocessed signal of the current frame;

performing time domain preprocessing on a second channel signal of the current frame to obtain a second preprocessed signal of the current frame;

obtaining an inter-channel delay parameter based on the first preprocessed signal and the second preprocessed signal;

quantizing the inter-channel delay parameter to obtain a quantized inter-channel delay parameter;

performing, at least based on the quantized inter-channel delay parameter, delay alignment processing on the first preprocessed signal to obtain a first delay aligned signal and on the second preprocessed signal to obtain a second delay aligned signal;

obtaining a channel combination solution of the current frame based on the first delay aligned signal and the second delay aligned signal;

obtaining, a quantized channel combination ratio factor of the current frame based on the channel combination solution, the first delay aligned signal, and the second delay aligned signal;

obtaining an encoding mode of the current frame based on the channel combination solution;

obtaining a primary channel signal and a secondary channel signal based on the encoding mode and the quantized channel combination ratio factor the first delay aligned signal and the second delay aligned signal; and encoding the primary channel signal and the secondary channel signal.

2. The method of claim 1, further comprising:

obtaining a signal type of the current frame based on the first delay aligned signal and the second delay aligned signal, wherein the signal type comprises a near in-phase signal or a near out-of-phase signal; and further obtaining the channel combination solution based on the signal type, wherein the channel combination solution comprises a near out-of-phase signal channel combination solution for processing the near out-of-phase signal or a near in-phase signal channel combination solution for processing the near in-phase signal.

3. The method of claim 2, wherein the channel combination solution is the near out-of-phase signal channel combination solution, and wherein the method further comprises:

obtaining, based on the first delay aligned signal and the second delay aligned signal, an amplitude correlation difference parameter between a first long-term smoothed signal corresponding to the first channel signal and a second long-term smoothed signal corresponding to the second channel signal;

converting the amplitude correlation difference parameter into a channel combination ratio factor of the current frame; and quantizing the channel combination ratio factor to obtain the quantized channel combination ratio factor and encoding index of the quantized channel combination ratio factor.

4. The method of claim 3, further comprising:

performing mapping processing on the amplitude correlation difference parameter to obtain a mapped parameter with a value within a preset value range; and converting the mapped parameter into the channel combination ratio factor.

5. The method of claim 4, further comprising:

performing an amplitude limiting process on the amplitude correlation difference parameter to obtain an amplitude limited parameter; and mapping the amplitude limited parameter to obtain the mapped parameter.

6. The method of claim 5, further comprising further performing the amplitude limiting process based on:

a maximum value of a plurality of amplitude limited parameters and a minimum value of the amplitude limited parameters; or the amplitude correlation difference parameter and the maximum value of the amplitude limited parameters.

7. The method of claim 5, further comprising mapping the amplitude limited parameter to obtain the mapped parameter based on:

the amplitude limited parameter, a first maximum value of a plurality of mapped parameters, a minimum value of the mapped parameters, a high threshold of the value of the mapped parameters, and a low threshold of the value of the mapped parameters; or the amplitude limited parameter and a second maximum value of a plurality of amplitude limited parameters.

8. The method of claim 5, further comprising mapping the amplitude limited parameter to obtain the mapped parameter based on:

the amplitude limited parameter and a first value range of a first plurality of constants; or the amplitude limited parameter and a second value range of a second plurality of constants.

9. The method of claim 4, further comprising further converting the amplitude correlation difference parameter into the channel combination ratio factor based on the mapped parameter.

10. The method of claim 3, wherein obtaining, based on the first delay aligned signal and the second delay aligned signal, the amplitude correlation difference parameter comprises:

obtaining a reference channel signal of the current frame based on the first delay aligned signal and the second delay aligned signal;

obtaining a first amplitude correlation parameter between the first delay aligned signal and the reference channel signal;

obtaining a second amplitude correlation parameter between the second delay aligned signal and the reference channel signal; and obtaining the amplitude correlation difference parameter based on the first amplitude correlation parameter and the second amplitude correlation parameter.

11. The method of claim 10, wherein obtaining the amplitude correlation difference parameter based on the first amplitude correlation parameter and the second amplitude correlation parameter comprises:

obtaining, based on the first amplitude correlation parameter, a third amplitude correlation parameter between the first long-term smoothed signal and the reference channel signal;

obtaining, based on the second amplitude correlation parameter, a fourth amplitude correlation parameter between the second long-term smoothed signal and the reference channel signal; and obtaining the amplitude correlation difference parameter based on the third amplitude correlation parameter and the fourth amplitude correlation parameter.

12. The method of claim 11, wherein the amplitude correlation difference parameter is based on the following formula:

$$\text{diff\_}lt\text{\_corr}=tdm\_lt\text{\_corr\_}LM\text{\_SM}_{cur}-tdm\_lt\text{\_corr\_}RM\_SM_{cur},$$

wherein diff_lt_corr is the amplitude correlation difference parameter, wherein $\text{tdm\_lt\_corr\_LM\_SM}_{cur}$ is the third amplitude correlation parameter, and wherein $\text{tdm\_lt\_corr\_RM\_SM}_{cur}$ is the fourth amplitude correlation parameter.

13. The method of claim 12, wherein either:

the third amplitude correlation parameter is based on a first smoothing factor (α), wherein a first value range of α being [0, 1], and corr_LM is the first amplitude correlation parameter; or the fourth amplitude correlation parameter is based on a second smoothing factor (β), a second value range of β being [0, 1], and corr_RM is the second amplitude correlation parameter.

14. The method of claim 13, wherein either:

the third amplitude correlation parameter is further based on a frame length of the current frame; or the fourth amplitude correlation parameter is further based on the frame length.

15. A stereo encoder, comprising:

a memory configured to store instructions; and at least one processor coupled to the memory and configured to execute the instructions, wherein the instructions cause the at least one processor to be configured to:

perform time domain preprocessing on a first channel signal of a current frame of a multi-channel audio signal to obtain a first preprocessed signal of the current frame;

perform time domain preprocessing on a second channel signal of the current frame to obtain a second preprocessed signal of the current frame;

obtain an inter-channel delay parameter based on the first preprocessed signal and the second preprocessed signal;

quantize the inter-channel delay parameter to obtain a quantized inter-channel delay parameter;

perform, at least based on the quantized inter-channel delay parameter, delay alignment processing on the first preprocessed signal to obtain a first delay aligned signal and on the second preprocessed signal to obtain a second delay aligned signal;

obtain a channel combination solution of the current frame based on the first delay aligned signal and the second delay aligned signal;

obtain, a quantized channel combination ratio factor of the current frame based on the channel combination solution, the first delay aligned signal, and the second delay aligned signal;

obtain an encoding mode of the current frame based on the channel combination solution;

obtain a primary channel signal and a secondary channel signal based on the encoding mode and the quantized channel combination ratio factor, the first delay aligned signal and the second delay aligned signal; and encode the primary channel signal and the secondary channel signal.

16. The stereo encoder of claim 15, wherein the instructions further cause the at least one processor to be configured to:

obtain a signal type of the current frame based on the first delay aligned signal and the second delay aligned signal, wherein the signal type comprises a near in-phase signal or a near out-of-phase signal; and further obtain the channel combination solution based on the signal type, wherein the channel combination solution comprises a near out-of-phase signal channel combination solution for processing the near out-of-phase signal or a near in-phase signal channel combination solution for processing the near in-phase signal.

17. The stereo encoder of claim 16, wherein the channel combination solution is the near out-of-phase signal channel combination solution, and wherein the instructions further cause the at least one processor to be configured to:

obtain, based on the first delay aligned signal and the second delay aligned signal, an amplitude correlation difference parameter between a first long-term smoothed signal corresponding to the first channel signal and a second long-term smoothed signal corresponding to the second channel signal;

convert the amplitude correlation difference parameter into a channel combination ratio factor of the current frame; and quantize the channel combination ratio factor to obtain the quantized channel combination ratio factor and an encoding index of the quantized channel combination ratio factor.

18. The stereo encoder of claim 17, wherein the instructions further cause the at least one processor to be configured to:

perform mapping processing on the amplitude correlation difference parameter to obtain a mapped parameter with a value within a preset value range; and convert the mapped parameter into the channel combination ratio factor.

19. The stereo encoder of claim 18, wherein the instructions further cause the at least one processor to be configured to:

perform amplitude limiting process on the amplitude correlation difference parameter to obtain an amplitude limited parameter; and map the amplitude limited parameter to obtain the mapped parameter.

20. A computer program product comprising computer-executable instructions that are stored on a non-transitory computer-read able storage medium and that, when executed by at least one processor of an apparatus, cause the apparatus to:

perform time domain preprocessing on a first channel signal of a current frame of a multi-channel audio signal to obtain a first preprocessed signal of the current frame;

perform time domain preprocessing on a second channel signal of the current frame to obtain a second preprocessed signal of the current frame;

obtain an inter-channel delay parameter based on the first preprocessed signal and the second preprocessed signal;

quantize the inter-channel delay parameter to obtain a quantized inter-channel delay parameter;

perform, at least based on the quantized inter-channel delay parameter, delay alignment processing on the first preprocessed signal to obtain a first delay aligned signal and on the second preprocessed signal to obtain a second delay aligned signal;

obtain a channel combination solution of the current frame based on the first delay aligned signal and the second delay aligned signal;

obtain a quantized channel combination ratio factor of the current frame based on the channel combination solution, the first delay aligned signal, and the second delay aligned signal;

obtain an encoding mode of the current frame based on the channel combination solution;

obtain a primary channel signal, and a secondary channel signal based on the encoding mode and the quantized channel combination ratio factor the first delay aligned signal and the second delay aligned signal; and encode the primary channel signal and the secondary channel signal.

* * * * *